US008530763B2

(12) United States Patent
Bradley

(10) Patent No.: US 8,530,763 B2
(45) Date of Patent: Sep. 10, 2013

(54) COUNTING SCALE AND METHOD OF COUNTING INVOLVING DETERMINATION OF SUBMULTIPLES BY MEANS OF A SERIES OF DIVISORS

(76) Inventor: James Roy Bradley, Carp (CA)

( * ) Notice: Subject to any disclaimer, the term of this patent is extended or adjusted under 35 U.S.C. 154(b) by 367 days.

(21) Appl. No.: 12/794,008

(22) Filed: Jun. 4, 2010

(65) Prior Publication Data

US 2010/0307839 A1 Dec. 9, 2010

Related U.S. Application Data

(60) Provisional application No. 61/185,358, filed on Jun. 9, 2009.

(51) Int. Cl.
G01G 19/42 (2006.01)
G01G 19/40 (2006.01)

(52) U.S. Cl.
USPC ........................................ 177/25.17

(58) Field of Classification Search
USPC ........... 177/25.17, 177.238–245, 262, 210 C; 222/572
See application file for complete search history.

(56) References Cited

U.S. PATENT DOCUMENTS

| 1,317,358 | A | * | 9/1919 | Dovener | 232/65 |
|---|---|---|---|---|---|
| 2,530,009 | A | * | 11/1950 | Fields | 222/129 |
| 3,481,415 | A | * | 12/1969 | Hutchinson | 177/253 |
| 3,819,064 | A | * | 6/1974 | Chandler | 414/675 |
| 3,991,841 | A | * | 11/1976 | Crawley | 177/225 |
| 4,157,738 | A | | 6/1979 | Nishiguchi et al. | |
| 4,398,613 | A | | 8/1983 | Hirano | |
| 4,433,741 | A | * | 2/1984 | Ryckman, Jr. | 177/199 |
| 4,438,823 | A | * | 3/1984 | Hussels et al. | 177/210 EM |
| 4,447,885 | A | | 5/1984 | Biss | |
| 4,493,384 | A | | 1/1985 | Yano et al. | |
| 4,512,428 | A | | 4/1985 | Bullivant | |
| 4,629,016 | A | | 12/1986 | Knothe et al. | |
| 4,646,767 | A | | 3/1987 | Hikita | |
| 4,674,060 | A | | 6/1987 | Larkin et al. | |
| 4,738,324 | A | * | 4/1988 | Borchard | 177/25.13 |
| 4,802,541 | A | * | 2/1989 | Bator et al. | 177/212 |
| 4,846,294 | A | * | 7/1989 | Sato | 177/210 C |
| 4,856,603 | A | * | 8/1989 | Murakoso et al. | 177/210 C |
| 5,150,759 | A | * | 9/1992 | Borchard | 177/210 C |
| 5,193,629 | A | * | 3/1993 | Lare | 177/25.17 |
| 5,199,517 | A | | 4/1993 | Kirby | |
| D341,298 | S | * | 11/1993 | Ancona et al. | D7/698 |
| 5,433,256 | A | * | 7/1995 | Vasers | 141/370 |

(Continued)

OTHER PUBLICATIONS

Steven K. Galson, M.D., M.P.H., Letter Regarding, Aug. 17, 2005, Department of Health & Human Services USA, Rockville, Maryland.

(Continued)

Primary Examiner — Randy W Gibson

(57) ABSTRACT

A counting scale can total the number of common articles transferred relative to the counting scale, when the transfers occur in stages. The scale has a weighing device for successively providing upon each staged transfer of the common articles, a weight signal signifying the current weight. The scale also has a processing device coupled to the weighing device for calculating a count in response to the weight signal provided by the weighing device upon the staged transfers. The processing device is operable to programmatically apply a series of divisors to consecutive values of the weight signal in order to automatically discern submultiples in the consecutive values. The scale also has an output device coupled to the processing device for presenting the count calculated by the processing device.

40 Claims, 15 Drawing Sheets

(56) References Cited

U.S. PATENT DOCUMENTS

| | | | |
|---|---|---|---|
| 5,608,193 A | 3/1997 | Almogaibil | |
| 6,147,312 A * | 11/2000 | Lockery | 177/211 |
| 6,196,426 B1 * | 3/2001 | White | 222/572 |
| 6,359,239 B1 * | 3/2002 | Missler et al. | 177/25.16 |
| 6,884,946 B2 | 4/2005 | Miller et al. | |
| 6,910,392 B2 * | 6/2005 | Lockery et al. | 73/862.627 |
| D519,278 S * | 4/2006 | Boerma | D3/304 |
| 7,073,707 B2 | 7/2006 | Carter | |
| 7,190,881 B2 * | 3/2007 | Takasu et al. | 386/278 |
| 7,633,018 B2 * | 12/2009 | Leisinger et al. | 177/25.13 |
| 8,063,320 B2 * | 11/2011 | Hamamoto et al. | 177/25.17 |
| 2003/0168260 A1 * | 9/2003 | Muyal | 177/25.15 |
| 2009/0205877 A1 * | 8/2009 | Claypool | 177/239 |
| 2011/0036644 A1 * | 2/2011 | Razzaghi | 177/25.17 |

OTHER PUBLICATIONS

Ted Dabney, Microchip Technology, Inc. 15-Kilogram Scale Using the TC500A and the TC520, AN780, 2002, Microchip Technology, Inc., USA.

Jerry Horn, Gordon Gleason, Lynium, L.L.C., Weigh Scale Applications for the MCP3551, AN1030, 2006, Microchip Technology, Inc.

* cited by examiner

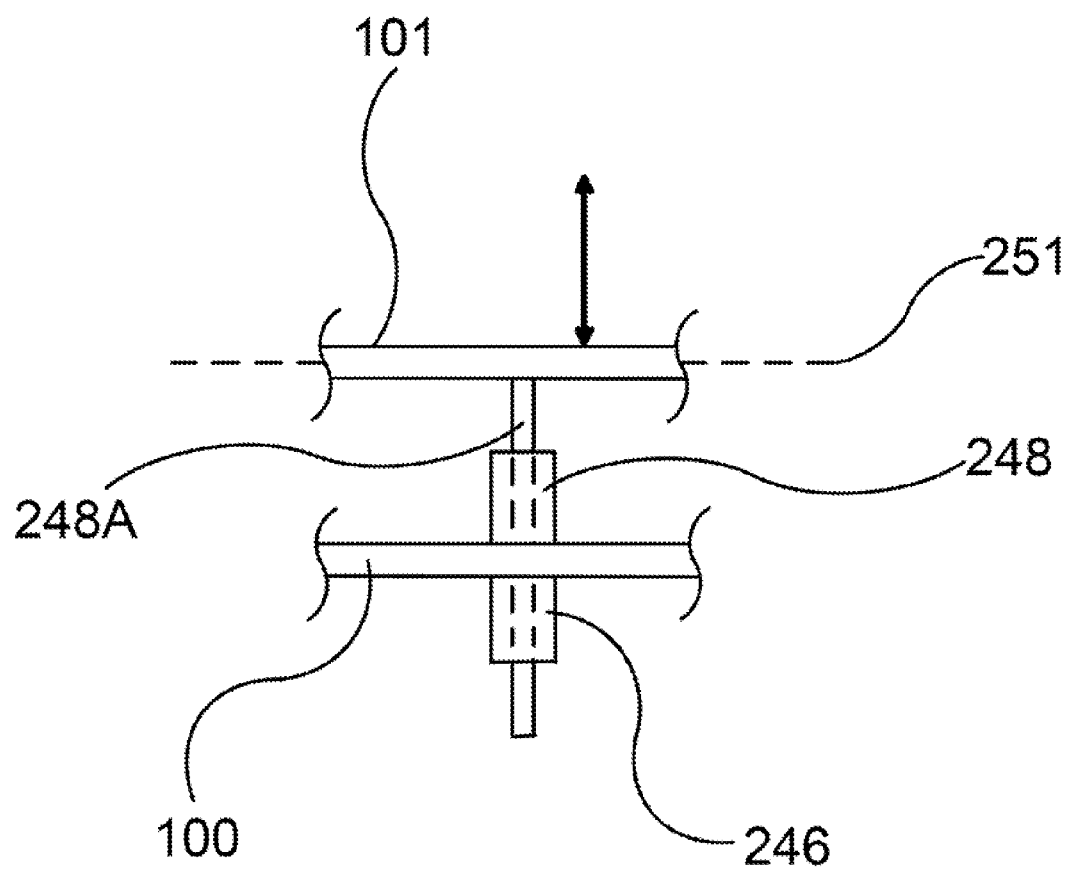

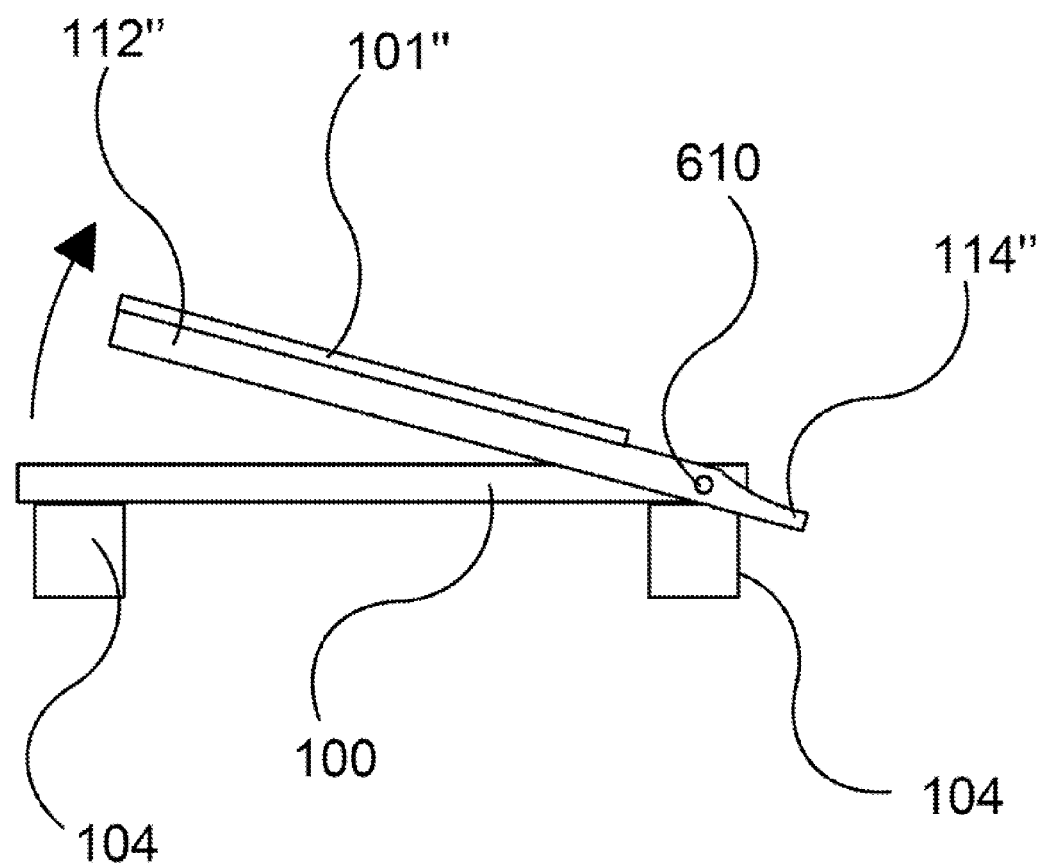

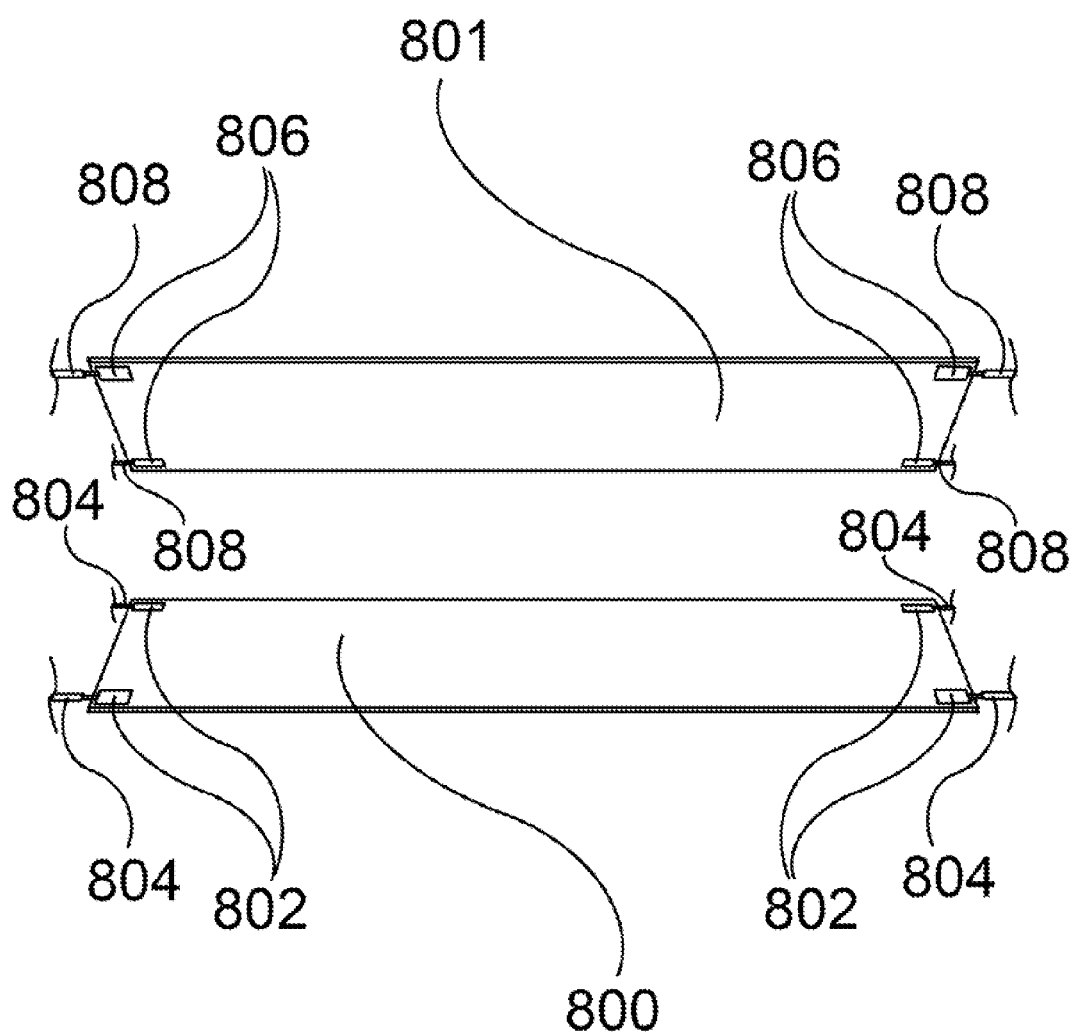

COUNTING SCALE AND METHOD OF COUNTING INVOLVING DETERMINATION OF SUBMULTIPLES BY MEANS OF A SERIES OF DIVISORS

CROSS-REFERENCES TO RELATED APPLICATIONS

This application claims the benefit of U.S. Provisional Patent Application Ser. No. 61/185,358, filed 9 Jun. 2009, the contents of which are hereby incorporated by reference herein.

BACKGROUND OF THE INVENTION

1. Field of the Invention

The present invention relates to counting scales and counting methods, and in particular, to the weighing of articles in order to derive a count.

2. Description of Related Art

Articles are often counted before being packaged and delivered. For example, common elements such as bolts may be counted before being priced/packaged and sold to a customer. Such counting ought to be done accurately, but can be monotonous and prone to errors when done repetitively.

Many different techniques exist for counting objects, from doing a visual examination, to establishing a unit weight and then making a measurement of the overall weight (optionally correcting for the tare) in order to deduce the count by dividing the overall weight by the unit weight. A related method employs a scale to weigh a single item and then enter that value into the scale memory for future use when determining from a cumulative weight the number of like-weight units being weighed.

Weighing scales may be produced using existing microprocessors that connect to a Wheatstone bridge. See application notes AN780 (2002) and AN1030 (2006) by Microchip Technology, Inc.

In a pharmacy, pills are routinely counted to fill a prescription that specifies a given number of pills. The counting must be done accurately not only because medications can be expensive, but because delivering the wrong number of pills can have adverse health consequences to a patient that ends up taking an insufficient or excessive number of doses. For pill counting, devices exist that permit pills to be counted by various means of filling a cavity and by mechanical techniques such as sweeping a count location volume to ensure that the correct number of units has passed.

A currently popular method of counting pills employed by pharmacists is to use a small plastic tray-like platform to support pills where they can be spread out on a relatively sterile environment and counted with a scalpel-like blade, which is used to sweep the pills.

After a quantity of pills is placed on the tray's platform, a blade may be used to successively sweep small numbers of pills into an adjoining trough while the pharmacist keeps count. Subsequently the tray is tilted and the lower end of the trough then serves as a partial funnel to guide the pills into the retail container.

See also U.S. Pat. Nos. 4,157,738; 4,398,613; 4,447,885; 4,493,384; 4,512,428; 4,629,016; 4,646,767; 4,674,060; 5,199,517; 5,608,193; 7,073,707; 4,646,767; and 6,884,946.

SUMMARY OF THE INVENTION

In accordance with the illustrative embodiments demonstrating features and advantages of the present invention, there is provided a counting scale for totaling the number of common articles transferred in stages relative to the counting scale. The scale has a weighing device for successively providing upon each staged transfer of the common articles, a weight signal signifying the current weight. The scale also has a processing device coupled to the weighing device for calculating a count in response to the weight signal provided by the weighing device for staged transfers. The processing device is operable to programmatically apply at least some of a series of divisors to consecutive values of the weight signal in order to automatically discern submultiples in the consecutive values. The scale also has an output device coupled to the processing device for presenting the count calculated by the processing device.

In accordance with another aspect of the invention a counting method is provided for totaling the number of common articles transferred in stages relative to a platform. The method includes the step of successively weighing upon each staged transfer of the common articles, the current weight at the platform. Another step is calculating a count based on the weight at the platform upon each staged transfer. This calculation is performed by programmatically applying at least some of a series of divisors to consecutive values of the weight at the platform in order to discern submultiples in the consecutive values.

By employing apparatus and methods of the foregoing type an improved counting and weighing technique is achieved. A disclosed device can rapidly count the number of units of a given item, and/or deduce the unit weight of the item for items of a sufficiently similar weight.

In a disclosed embodiment a device for weigh counting objects has a sensing element for producing signals representative of a measured weight. These weight signals are transmitted to a device for displaying number, and optionally, weight. An associated processor conditions this signal prior to display.

The device can be enhanced by knowing one or more limits of the measured parameter, such as the upper weight limit of a unit, or the tare of the scale.

The present disclosure describes a system which uses a strain gauge to determine the weight of successive collections of articles, exploiting two weigh cases, three weigh cases or a greater number of weigh cases.

In a disclosed embodiment for a pharmacist/technician, the counting will be modified in that pills will be transferred to the tray in successive groups, perhaps with restrictions as to the number that can be placed on the scale, e.g. to avoid dumping the pills onto the scale in repetitive groups of twos, threes, fours, etc.

A further optional enhancement is the addition of a microphone for detecting an indication of the number of pulses of sound made as the items are dropped onto the scale or an indication of the time at which various swipes are made.

The device may have a display that can be made obscure in that the displayed, derived value(s) can be hidden from view to prevent its use as a primary count checker. For example, a disclosed system places the display on the underside of a tray table where the results cannot be observed initially. Such an arrangement can be advantageous in the case of weighing pills, in that increased reliability will be obtained by forcing the pharmacy personnel to count the pills first and use the results of the automated weigh count process as ancillary. Once the user decides that the correct number of pills has been delivered, a cross check becomes available when the tray holding the pills is tilted to guide the pills into a container at the conclusion of the counting activity.

In one embodiment the scale can weigh count as the items leave the face of the table upon which they were weighed; i.e. as pills are removed from the table consecutive weighing takes place. The changes resulting from the successive weighings are used to calculate the total number of pills, the resulting count of which is displayed on a display that may be initially hidden from view underneath the tray table. As the user completes the counting, the display on the underside can be reviewed at the same time that the counted units are placed in a pill container, post counting. In some embodiments the tray may be transparent so that an underlying display will always be visible and for this case the display may be blanked until the counting process is completed.

Since the device/method typically will be used for a cross check only, the need for an elaborate weighing device is eliminated. The same inexpensive plastic counting tray that is used today can be used, with the addition of a relatively inexpensive weighing capability.

In some cases the system will process a set of weighings (e.g. three weighings) by dividing each of the weighings by a prospective unit weight, at a time when the unit weight is unknown. Moreover, the prospective unit weight will be stepped through a predetermined range of potential unit weights to obtain for each of the steps a set of divided values representing the potential counts for each of the weighings. The system will select as most likely, that set of divided values having the lowest remainders after the divisions. In the event where multiple sets produce remainders that are about as favorable, the ambiguity may be resolved by choosing the higher count (or in some embodiments the lower count). Other arbitration techniques are disclosed for resolving ambiguities.

Alternatively, the system can process each set of weighings by dividing each of the weighings of the set by a series of proposed counts to obtain a series of prospective unit weights. This produces a series of prospective unit weights for the first weighing, a series of prospective unit weights for the second weighing, third weighing, and so forth. Each of the series are searched to find unit values that substantially match, thereby producing at least one collection of count values, one count for each of the weighings. Again, where matches are found having about the same quality, the ambiguity can be resolved by choosing the lower count (or in some embodiments the higher count), or by some other matching criteria.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein:

FIG. 8 is fragmentary side view of the platform of FIG. 9 showing its weighing device;

FIG. 9 is a side view of the tray of FIG. 5, modified to include a trough that can be tilted in order to empty it;

FIG. 10 is a perspective view of an alternate weighing platform and frame that may be incorporated into the trays of FIGS. 1 and 3-5;

DETAILED DESCRIPTION OF THE PREFERRED EMBODIMENTS

Figure 1:
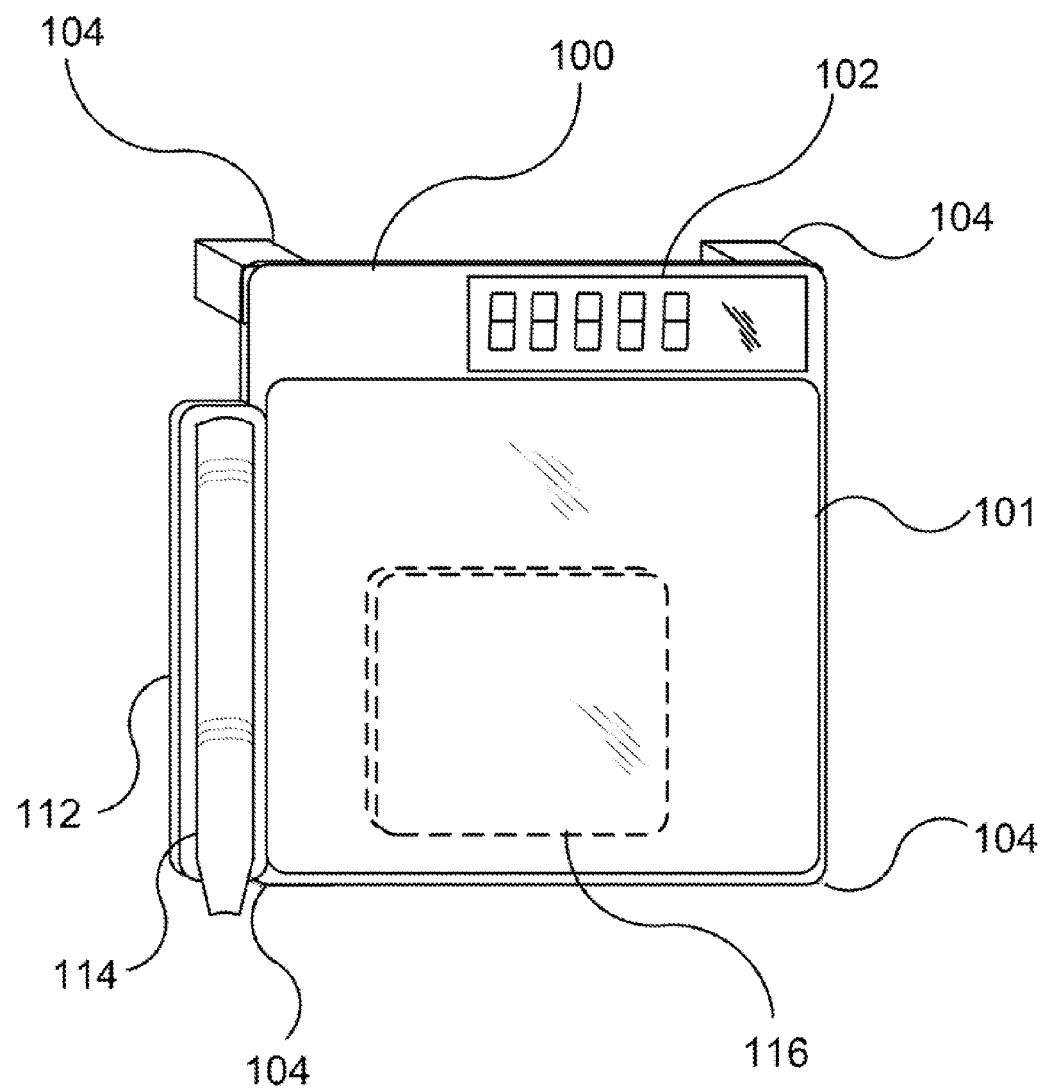
FIG. 1 is a perspective view of a scale in accordance with principles of the present invention.

Referring to FIG. 1, a counting scale is shown as a tray 100 supported by four legs 104 at each of the four corners of the tray (the tray also referred to herein as a frame). One edge of platform 101 leads to a trough 112 having an outlet spout 114. In a conventional counting tray, a pharmacist will place a number of pills on platform 101 and then use a spatula or other blade, to sweep pills into trough 112, counting the pills as they are swept. Thereafter, the trough 112 can be tilted to funnel the pills into a retail container. While pill counting will be described, the disclosed system can be used to count any type of article, especially articles that have about the same unit weight.

Platform 101 is installed atop a weighing device (as described further hereinafter) that can produce a weight signal signifying the weight of articles placed on platform 101. This weight signal is conveyed to a processing device on circuit board 116 in order to drive output device 102.

Figure 2A:
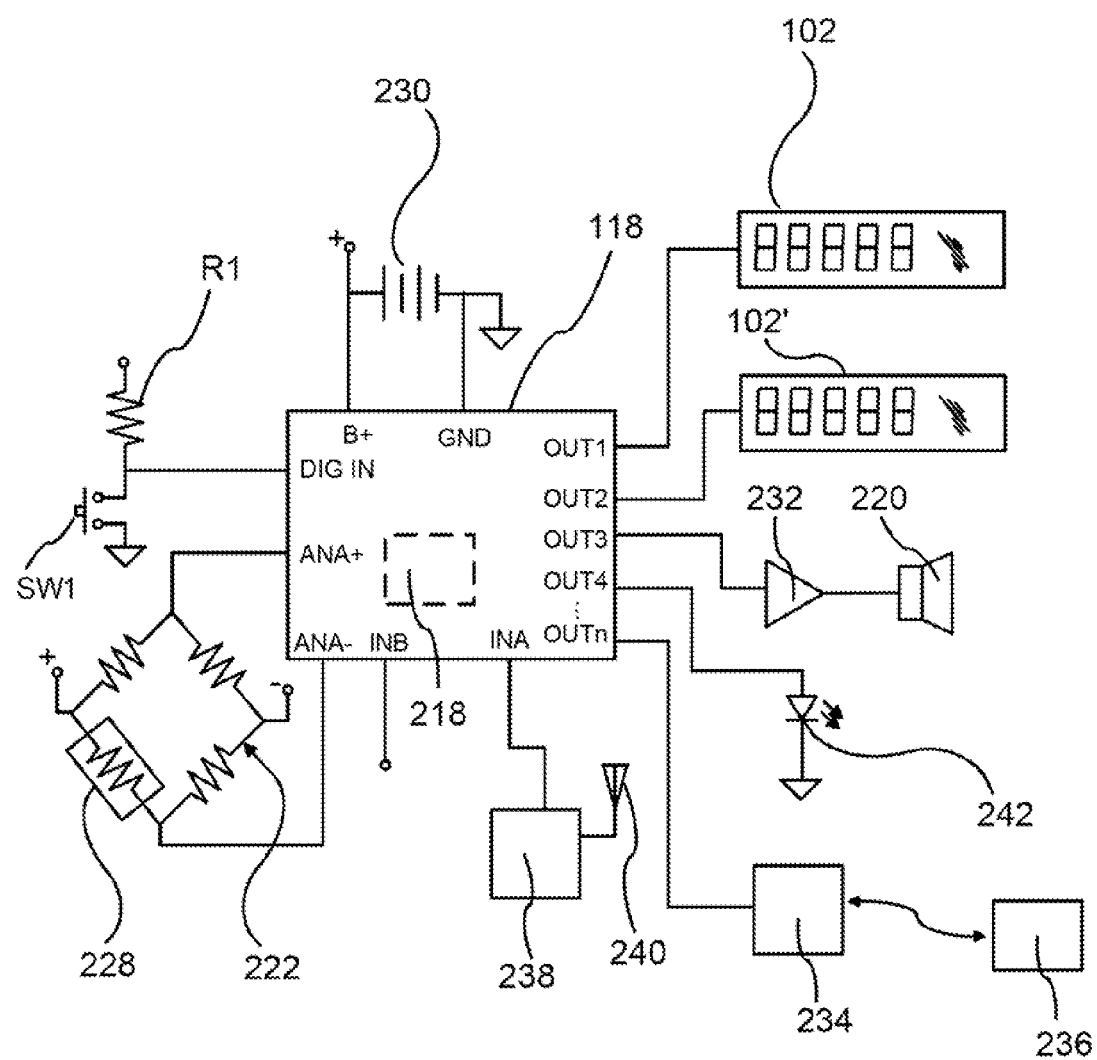
FIG. 2A is a schematic block diagram associated with the device of FIG. 1.

Referring to FIG. 2A, the previously mentioned processing device is shown as microcontroller 118. Using programming contained in memory 218 microcontroller 118 can calculate a count based on weight measurements. Memory 218 may also store during runtime, intermediate weight values, final weight values, etc.

The previously mentioned weighing device is shown here employing strain gauge 228, which is connected in at least one of the legs of Wheatstone bridge 222. Two opposite corners of bridge 222 are connected to a reference positive and negative potential, while the two remaining corners are connected to terminals ANA+ and ANA− of microcontroller 118 to provide thereto a weight signal. Bridge 222 is set up so that with no weight on the platform, a zero potential difference exists at terminals ANA+ and ANA− (although other embodiments may not be so balanced).

Strain gauge 228 is part of a structure that supports the tray platform 101 (FIG. 1) so that weight placed on the platform will cause a measurable strain in strain gauge 228. In some embodiments the strain gauge may be supportively mounted under the center of tray platform 101. In other embodiments, multiple such weighing devices may be placed in the tray legs (legs 104 of FIG. 1). Strain gauge 228 may be a wire whose resistance changes with the applied strain. In some embodiments the strain gauge 228 may be a semiconductor strain gauge or a dielectric strain gauge.

Instead of a strain gauge, some embodiments may employ a spring (not shown) that will be deflected in proportion to the measured weight. In this case deflection may be measured by a distance or position sensor (not shown in this Figure) such as a slide potentiometer, a shaft encoder, an optical scale and reader, a distance measuring device, an LVDT sensor, an RVDT sensor plus gear, etc. In other embodiments the weight measuring device may be composed of a spring-supported platform for holding a number of pills, wherein Hooke's constant of the spring is known precisely. Using Hooke's constant and the detected frequency of oscillation of the platform, the system can determine the loaded mass of the platform to derive the weight of the pills on the platform.

Microcontroller 118 is connected in a circuit with various other components. In particular, the positive and negative terminals of battery 230 are connected to terminals B+ and GND, respectively, of microcontroller 118. Accordingly, the system is self-contained and portable.

Momentary contact switch SW1 is connected between ground and the junction of pull-up resistor R1 and terminal DIG IN of microcontroller 118. Switch SW1 is mounted in one of the tray legs 104 of FIG. 1 and is arranged to close when the tray legs are resting on a horizontal surface (thereby acting as a finish sensor). In some embodiments weight-on-leg switches may be installed in one, two, three, or all the legs. As described subsequently, switch SW1 may be associated with other tray structure and may respond to movement or engagement of this other structure.

The weight-on-legs switch(es) SW1 are sufficiently resilient as to permit the entire table weight to be placed on each. In some cases the table legs may encompass the switch actuators so as to take the entire table weight and once the switch element has become sufficiently compressed (or displaced, rotated, bent, or deformed) actuate the switch before the table leg begins supporting the weight of the table.

In another embodiment the switch is a suitably disposed, distance measuring device located on the lower side of the weighing table to detect whether the unit has been lifted, exploiting the assumption that the lifted unit is presently being used to pour items into another container. In other embodiments the tray may have a trough that articulates to dispense the counted items and operate a switch to indicate the counting process is done.

For microcontroller 118 data is output via ports OUT1-OUTn, or a combination of them. Ports OUT1-OUTn are at least one of: a parallel port, serial port, wireless port, or a combination of these.

Microcontroller output OUT1 is connected to previously mentioned display 102, which may be an LED or DLP display, a CRT, an LED seven segment display, or other suitable display device. Display 102 will be used by microcontroller 118 to display a count derived by calculations performed in the microcontroller. Display 102 may be a local display mounted on the previously mentioned tray (tray 100 of FIG. 1) or, optionally, a remote display located off the tray and connected to microcontroller 118 either directly or wirelessly. In this embodiment optional output OUT3 may be coupled through amplifier 232 to loudspeaker 220 to announce the count calculation using synthesized speech.

The availability of a reliable count is signaled by output OUT4, which is connected to the anode of optional LED 242 (also referred to as an annunciator), whose cathode is grounded. Also, optional output OUTn may connect through wireless modem 234 to remote device 236. In one embodiment device 236 is a handheld computing device (i.e., a PDA) for displaying the calculated count on the PDA.

In some embodiments, remote device 236 may be a pharmacy's prescription system, which typically provides access to a database of patients, their insurers, prescriptions filled and about to be filled, medication inventory, etc. A count supplied from modem 234 is received by remote system 236 and is used to drive a printer (not shown) in order to automatically prepare a label for the patient's retail container. This label can include the patient's name, details on the prescription, and the number of pills in the container as indicated by modem 234.

Output OUT2 connects to optional display 102' for exhibiting an advertising message. The advertising, message may be stored in memory 218 and may be exhibited as a succession of discrete phrases or as a long phrase that scrolls, tickertape style. In some embodiments the display 102' will have a sufficient number of pixels to allow display of an image. In some cases the advertising message may be supplied to microcontroller input INA by receiver 238 (e.g., a short messaging system (SMS), etc.), which serves as a wireless connection via antenna 240 to a source of advertising content. The mounting of displays is as described hereinafter in FIG. 5 with advertising display 102' on top and normal count display 102 below.

It will be understood that any one of a variety of additional outputs can be provided from microcontroller 118. For example, microcontroller 118 can be supplemented with a USB interface or other similar interface such as SPI, I2C, Firewire, Bluetooth, IEEE802.11, IEEE802.16, EIA RS232, IRDA or other generic link. Moreover, microcontroller 118 has an additional analog input INB for a microphone or other source.

Figure 3:
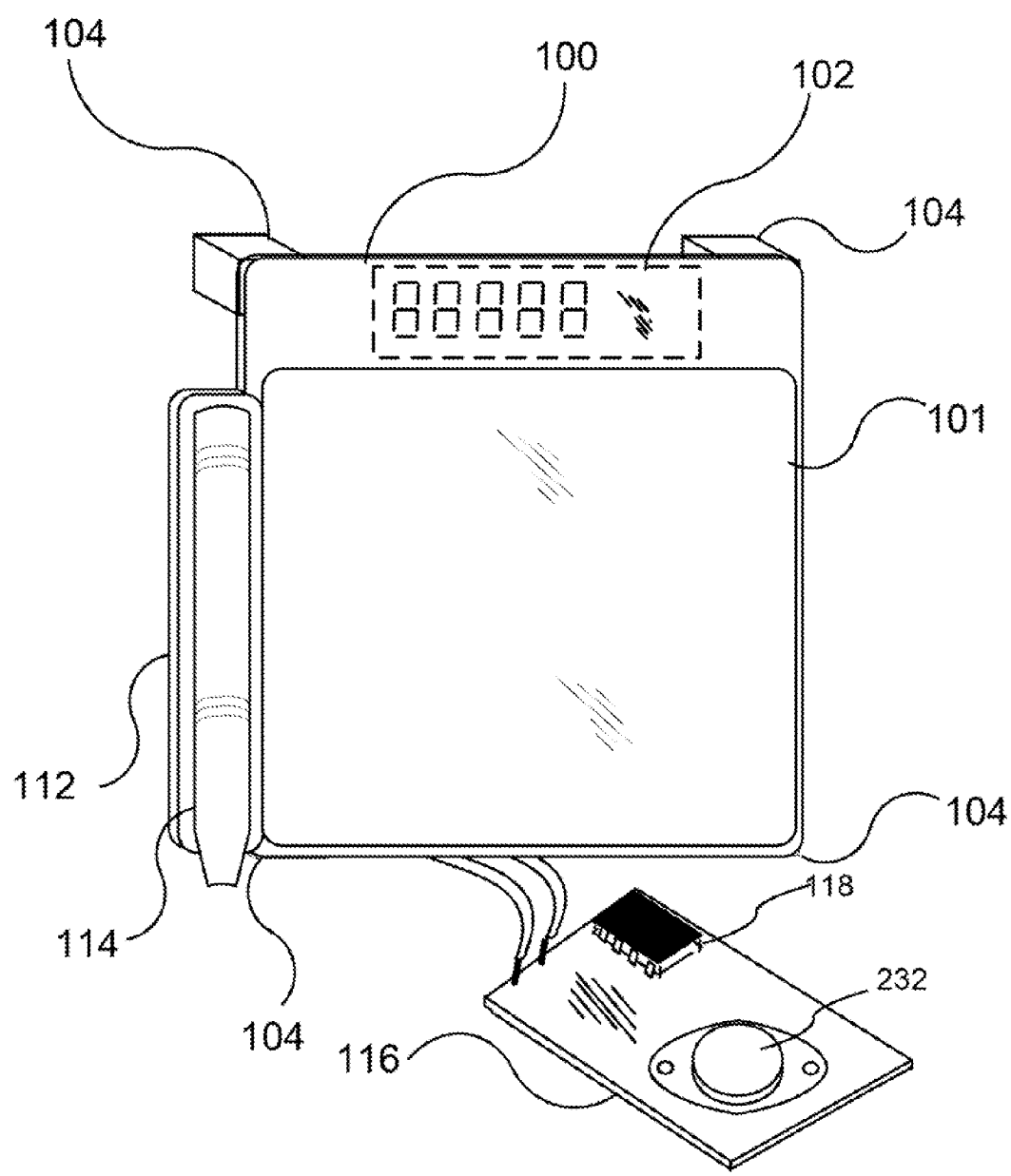
FIG. 3 is a perspective view of a device that is an alternate to that of FIG. 1, and is partially disassembled wherein the control processor circuitry is shown separated from the main body of the scale.

Referring to FIG. 3, previously mentioned microcontroller 118 is shown mounted on circuit board 116. This Figure does not illustrate all of the components on board 116 but does show power transistor 232, which was schematically illustrated in FIG. 2A as amplifier 232.

In this embodiment, display 102 is mounted at an alternate position. Specifically, display 102 is placed at the underside of tray 100 to prevent premature reading of the display. Thus, counting must be performed manually on platform 101 and the pills swept into and spilled out of trough 112 before the tray 100 can be inverted to read the display 102. This assures that the count on display in 102 is used as a check, and not as the primary means of counting.

Referring to FIG. 4, display 102 is again located on the underside of the device. Optional switch 108 is attached to, and has its freedom of motion partially constrained by, axle 106. If tray 100 is tilted sufficiently from horizontal, switch 108 acts as a finish sensor to detect such tilting, reorientation, translation or other displacement. Sensor 108 thereby signals board 116 that weighing has ended and the results may be displayed. This tilting motion may represent the pouring of items, such as pills, into a container. Moreover, if a tilted tray returns to horizontal, switch 108 will then indicate that a new weighing cycle can now begin at any time.

While the foregoing showed a switch operating much like an inclinometer, other embodiments may use an accelerometer to determine whether the tray is stationary or not. The accelerometer may be in the form of a simple reference weight that is cantilevered to deflect a beam upon accelerating. The local acceleration vector direction may be used to deduce whether tray 100 is being tilted, before performing a final count calculation and displaying the results.

In this embodiment tray frame 100 has a handle 254 that may be grasped to lift and tilt the tray when dispensing pills from trough 112. Handle 254 has an engagement (finish) sensor 256 in the form of a trigger that is operated by the manual pressure produced when grasping the handle in order to drive a momentary contact switch. Detecting when the handle 254 has been gripped will thus provide an indication that the measurement process is complete and a final count can be calculated. Alternatively, a proximity sensor can be used that operates optically (visible or infrared), capacitively, ultrasonically, or by other means.

Also, tray 100 has a microphone 224 that can connect to the extra input INB of microcontroller 118 (FIG. 2A) to provide an additional means for sensing the transfer of pills to tray 101. Also, in this embodiment previously mentioned loudspeaker 220 and LED 242 are shown mounted in one corner of tray 100.

Figure 4:
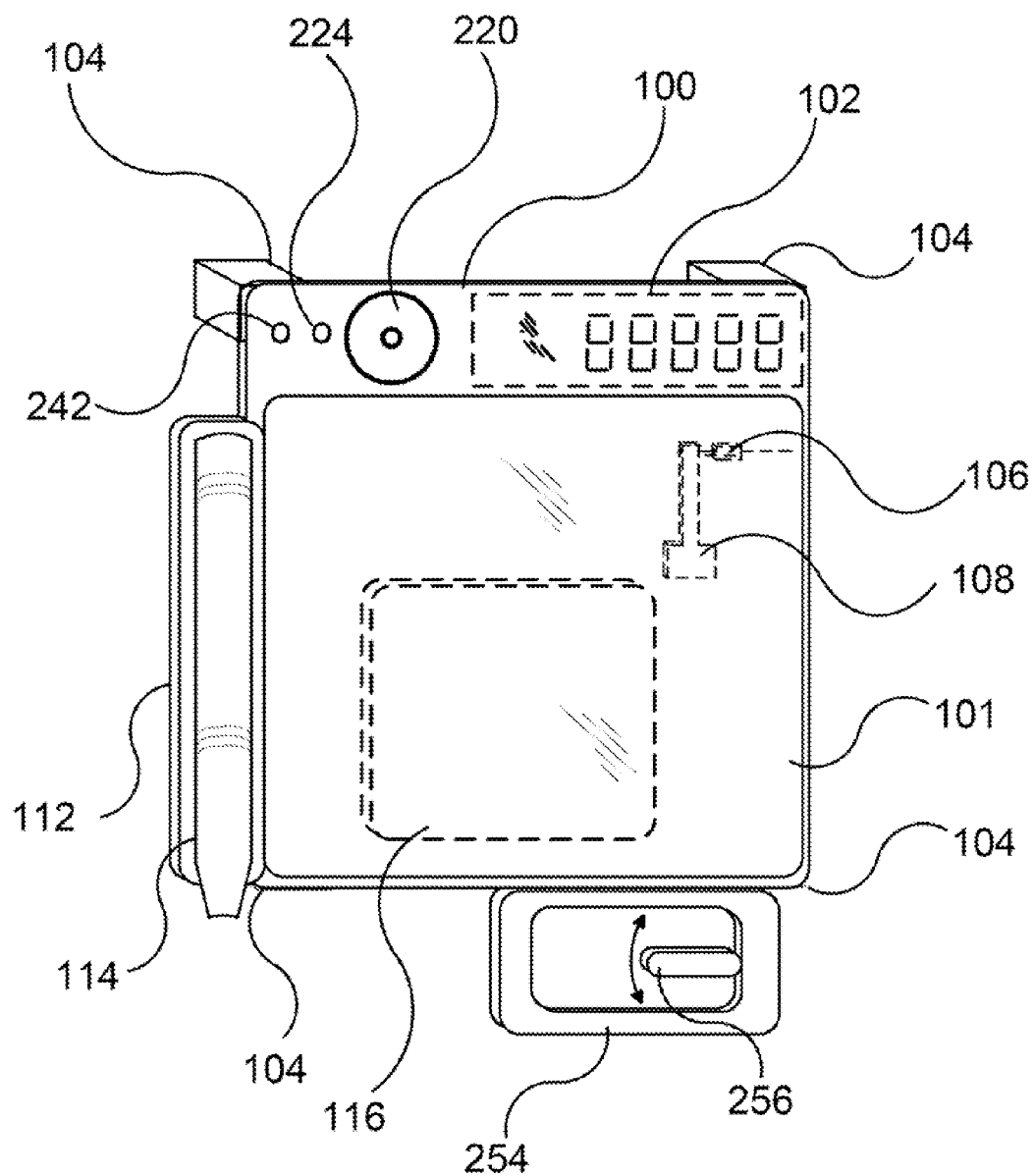
FIG. 4 is a perspective view of a device that is an alternate to that of FIGS. 1 and 3, wherein the count display, as well as a direction switch, are mounted at the underside of the device.
Figure 5:
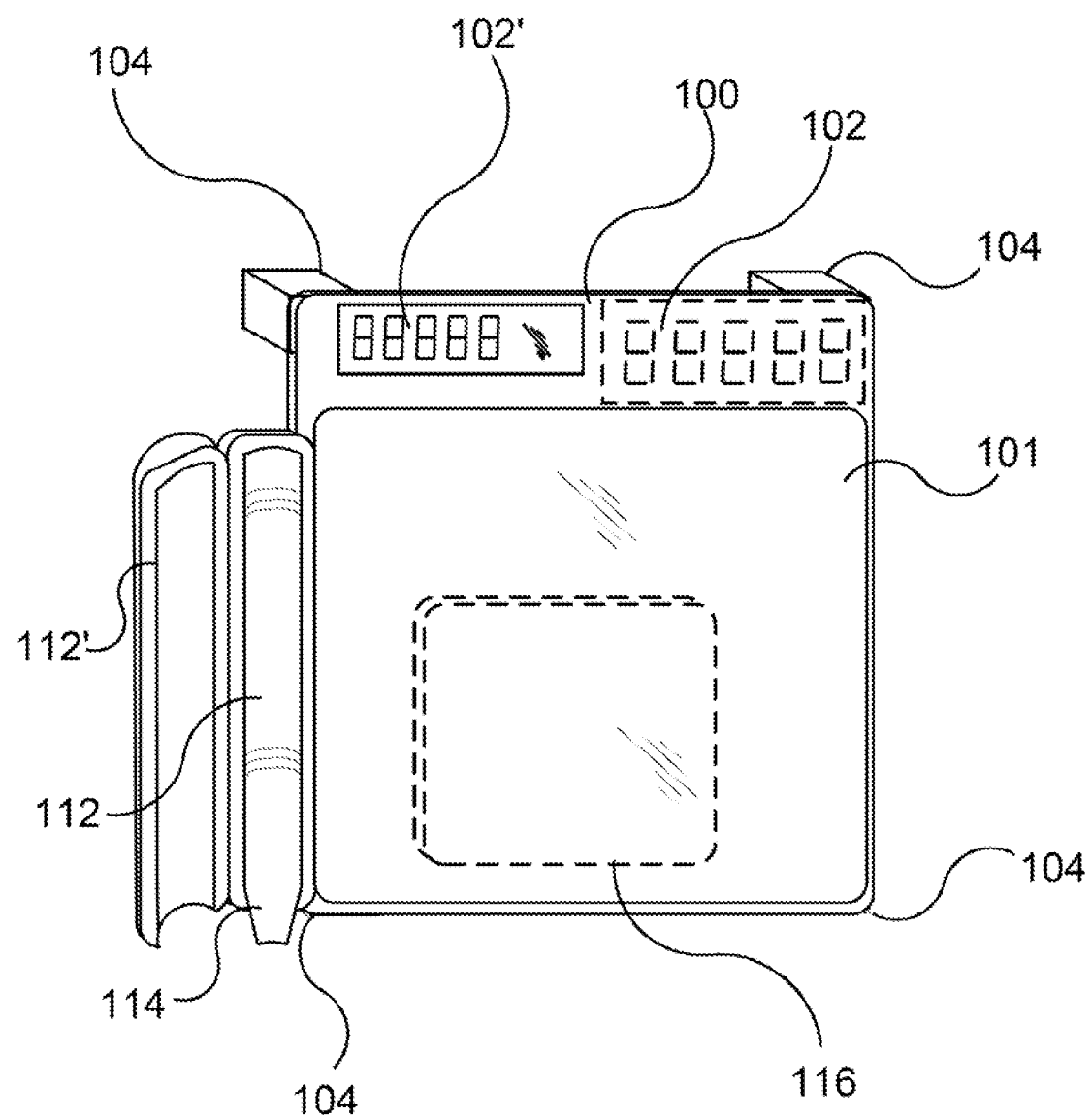
FIG. 5 is a perspective view of a device that is an alternate to that of the prior Figures, wherein the count display is mounted at the underside of the device, an advertising display is mounted on top, and the trough has a hinged cover.

Referring to FIG. 5, tray 100 is similar to those of FIGS. 1 and 4, except the advertising display 102' previously mentioned in connection with FIG. 2A, is mounted on top and previously mentioned normal count display 102 is mounted below. Components in FIG. 5 corresponding to those previously illustrated in FIG. 1 bear the same reference numeral.

In this embodiment, trough 112 is fitted with a hinged cover 112'. Accordingly, a user can sweep pills from platform 101 into trough 112 before closing cover 112' and thereby keep pills from spilling laterally from the trough. Consequently, the pills will all funnel through spout 114 into a retail container (not shown). Also, a cover switch (not shown in this view) will act as a finish sensor by detecting closure of cover 112', which signals the end of the measuring process so that a final count can be calculated. This cover switch will embody switch SW1 of FIG. 2A.

Figure 2B:
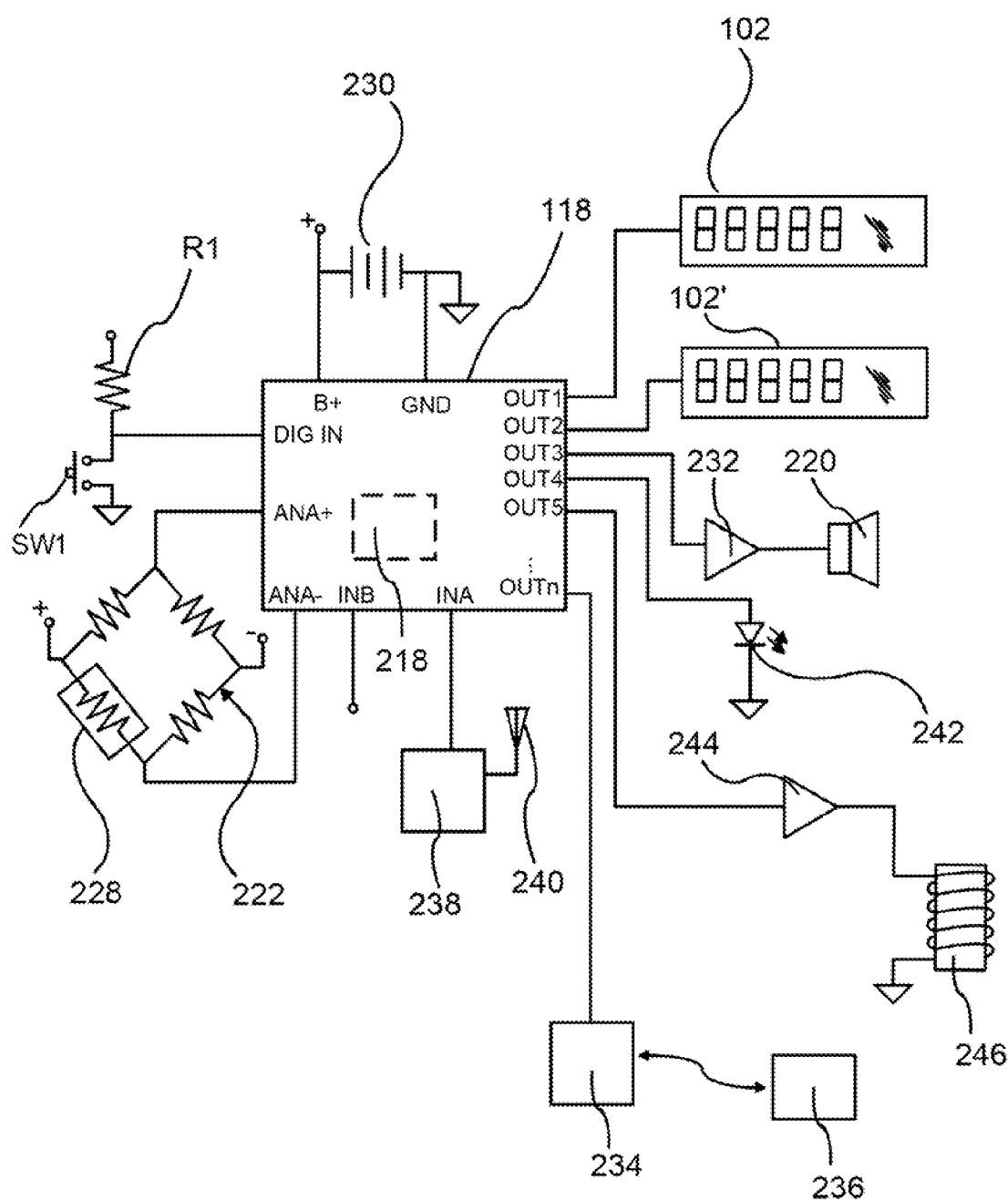
FIG. 2B is a schematic block diagram that is an alternate to that of FIG. 2A.

Referring to FIG. 2B, this diagram is similar to FIG. 2A, except for an additional output terminal OUT5 that connects through amplifier 244 in order to variably drive solenoid 246 with either an analog signal or a chopped waveform. Solenoid 246 is connected to the previously mentioned weighing platform (platform 101 of FIG. 1) and can change its vertical position relative to the rest of the tray. While a simple solenoid was just mentioned, in some embodiments the solenoid can be replaced with another actuator such as a more complex servomechanism (servo) with a control loop using feedback sensors.

In operation, microcontroller 118 adjusts the current through solenoid 246 until the weighing platform reaches a predetermined neutral position, which position is verified when strain gauge 228 produces a predetermined voltage across terminals ANA+ and ANA−; for example, zero volts. The weight on the platform can then be determined by the magnitude of current that had to be applied to solenoid 246 in order to drive the platform to the neutral position. Since measurements are always made with the weighing platform at the same neutral position, the measurement is unaffected by the linearity of strain gauge 228. The magnitude of drive applied to solenoid 246 may not be proportional to weight and in that case the drive magnitude may be converted to a weight through a lookup table in memory 218.

Figure 2C:
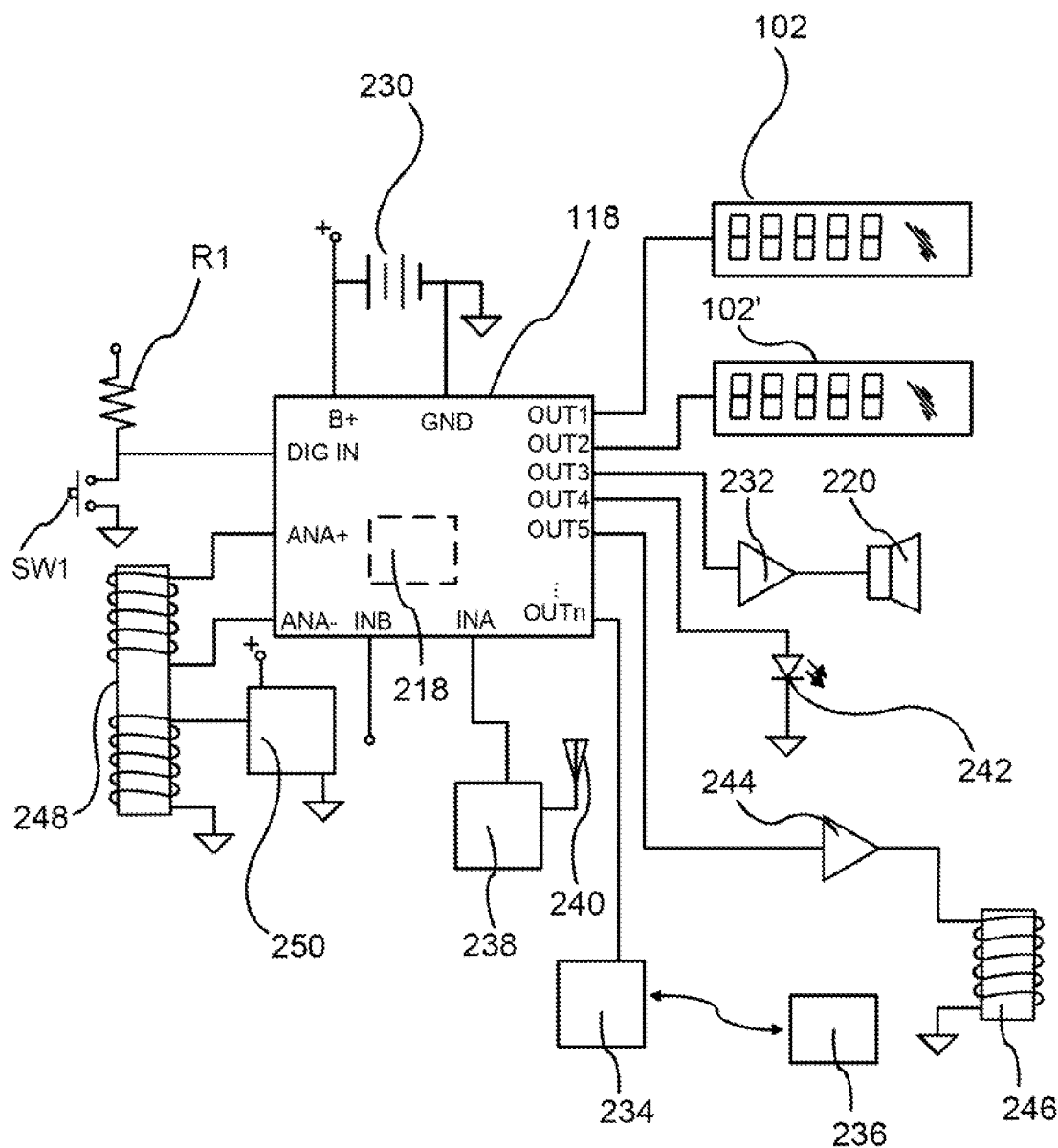
FIG. 2C is a schematic block diagram that is an alternate to that of FIGS. 2A and 2B.

Referring to FIG. 2C, this diagram is similar to FIG. 2B, except the Wheatstone bridge is replaced with linear variable differential transformer 248 (LVDT 248) acting as a position sensor. Alternating current source 250 drives the primary of LVDT 248, whose secondary is connected to previously mentioned terminals ANA+ and ANA−.

LVDT 248 and solenoid 246 may be mounted on tray frame 100 as shown in FIG. 8 so that their respective windings remain stationary relative to the tray. Movable core 248A of LVDT 248 is shown attached to the underside of movable platform 101, which is shown in its neutral position 251. Core 248A extends through solenoid 246 to be driven thereby.

In operation, microcontroller 118 (FIG. 2C) adjusts the current through solenoid 246 until the platform reaches the predefined neutral position 251 (FIG. 8), which position is verified when the secondary output of LVDT 248 produces at terminal ANA+ a predetermined voltage; for example, 1.0 volts, peak. The weight on platform 101 can then be determined by the magnitude of the current (or other drive characteristic such as frequency, duty cycle, force, voltage, pressure, phase, etc.) that had to be applied to solenoid 246 in order to drive the platform to the neutral position 251. The solenoid drive can be converted to a weight by using a lookup table stored in memory 218. Since measurements are always taken with the platform 101 at the same neutral position 251, the measurement is unaffected by the linearity of LVDT 248.

Figure 7:
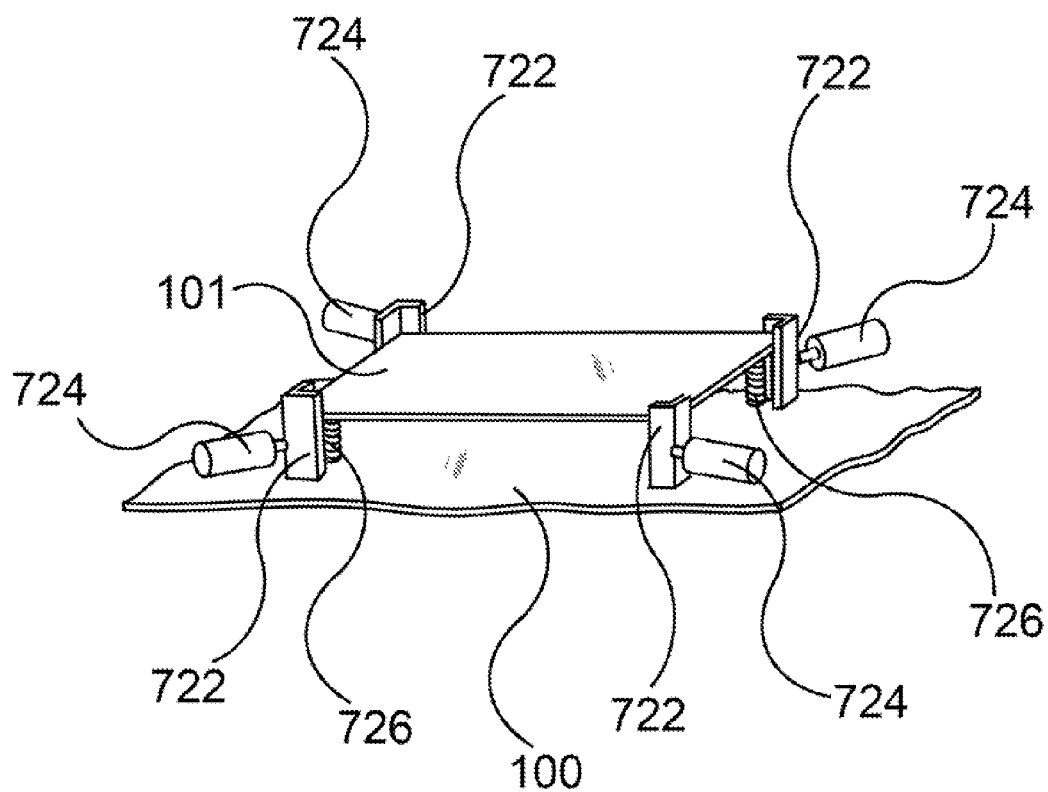
FIG. 7 is a perspective view, with portions broken away, of a weighing platform that may be incorporated into the trays of FIGS. 1 and 3-5.

For embodiments such as FIG. 8 where platform 101 is movable relative to the overall tray structure 100, LVDT 248 and solenoid 246 should be protected against mechanical shocks. For this reason, the four corners of platform 101 are fitted as shown in FIG. 7 with four locking brakes 722. Each of the brakes 722 are shaped like an angle iron with its outside corner attached to the connecting rod of an actuator 724, which may be a solenoid, piezo-electric transducer, etc. Actuators 724 are oriented diagonally at the four corners of platform 101 and are biased to normally press brakes 722 against the platform. When powered, actuators 724 retract brakes 722, allowing platform 101 to move relative to tray 100. In this embodiment platform 101 is subjacently supported at its four corners by compression springs 726.

While weight sensor 246/248 is shown connected to platform 101 to determine the weight of articles thereon, in some embodiments the weight sensor can connect to the trough (trough 112 of FIG. 5) to determine the weight of articles therein. In still other embodiments multiple weight sensors may be employed, one for the platform and one for the trough. Accordingly, weight changes can be detected as articles are moved from the platform to the trough. Alternatively, the platform can be segregated into two or more discrete sections each with its own individual weight sensor. In the latter case weights are measured as articles are moved from one section to the other.

The separate weighing of pills in the trough 112 can be advantageous when the user spills too many pills on platform 101 and therefore only sweeps some of them into trough 112. Microcontroller 118 can then count only the pills that are swept into trough 112. However, as described hereinafter, spilling too many pills on platform 101 can also be handled by measuring decrements in the weight on platform 101. Moreover, counting both the pills leaving platform 101 and the pills entering trough 112 provides redundant measurements and increases the count accuracy.

Referring to FIG. 9, the tray of FIG. 1 has been modified to include an articulated trough 112" and platform 101". Components in FIG. 9 corresponding to those previously illustrated in FIG. 1 bear the same reference numeral. After sweeping pills from platform 101" into trough 112", a user can articulate elements 101" and 112" about pivot 610 as shown. Pills will therefore slide down the tilted trough 112" and through spout 114" into a retail container (not shown). Also, a trough switch (not shown in this view) will act as a finish sensor by detecting tilting of trough 112", which signals the end of the measuring process so that a final count can be calculated. This trough switch will embody switch SW1 of FIG. 2A.

Figure 6:
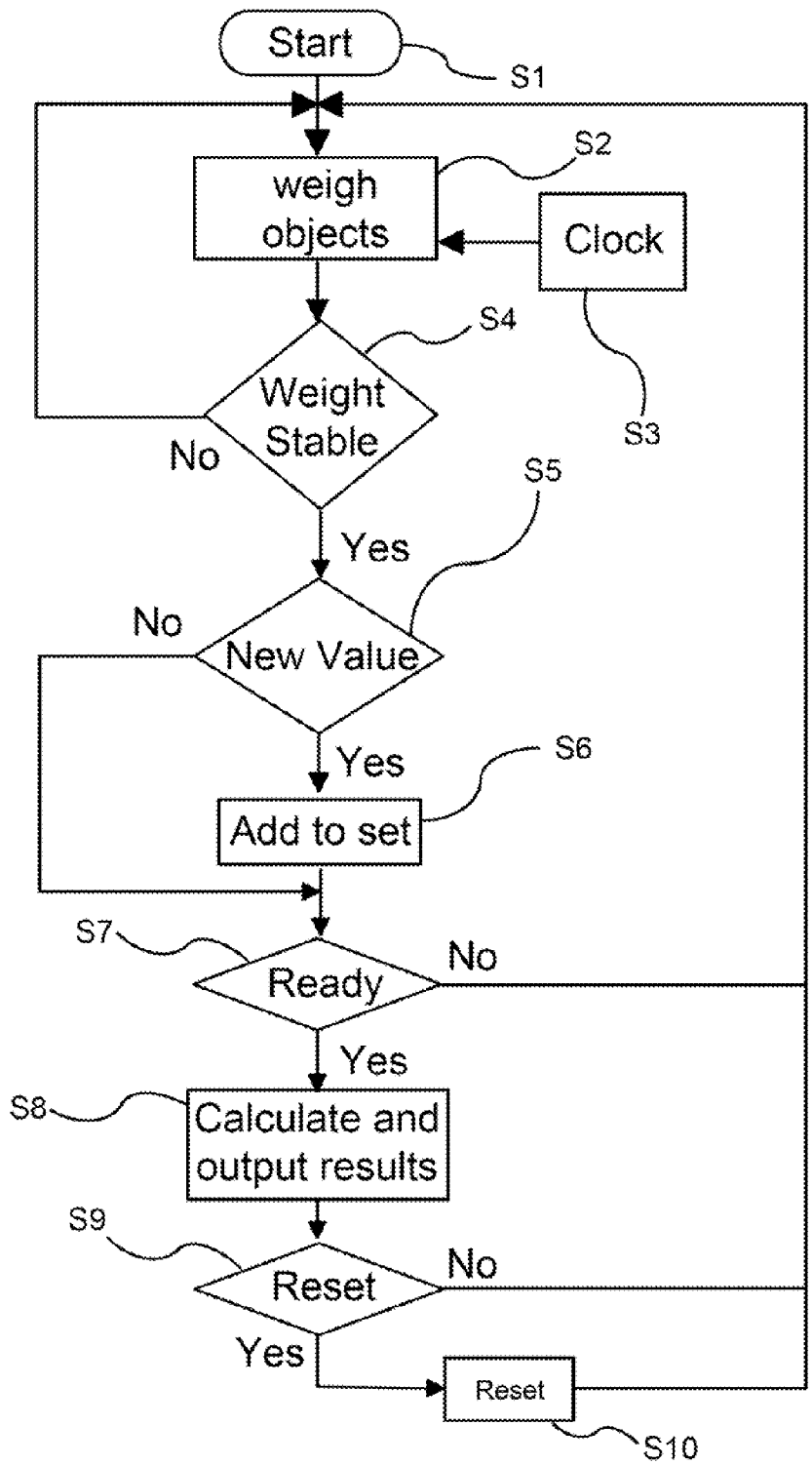
FIG. 6 is a flow chart representing the operation of the scale of FIG. 5.

To facilitate an understanding of the principles associated with the foregoing apparatus, its operation will be briefly described in connection with the apparatus of FIGS. 2A, 5 and 6. The apparatus of FIG. 5 is arranged with a count display 102 below and an advertising display 102' on top. It will be appreciated that the devices of FIGS. 1, 3, 4 and 9 operate in substantially the same manner with differences noted previously.

When tray 100 is initially placed on a counter or other horizontal surface, switch SW1 (FIG. 2A) closes and such closure is detected at input DIG IN of microcontroller 118. In response, the program in memory 218 starts the programmed process, indicated as step S1 in FIG. 6. In succeeding step S2 weighing occurs.

Microcontroller 118 has an analog-to-digital converter to convert the weight signal at terminals ANA+ and ANA− into a digital form. In particular, the potential difference on terminals ANA+ and ANA− is sampled, digitized, and optionally scaled to produce a weight value in some standard or arbitrary measurement system. It will be appreciated that for obtaining just a count, scaling is unimportant and the device need not be calibrated.

It will be presumed that at this time no pills have been placed on platform 101 and so the system measures zero weight. A null measurement is not considered significant and the system continues sampling at terminals ANA+ and ANA−, waiting for a change. The sampling rate is regulated by the clocking feature of step S3. In one embodiment the sampling repetition period is 1 ms, although other sampling times may be employed in other embodiments.

Eventually, a group of pills is placed on platform 101. Simultaneously, the operator observes the number of pills placed on platform 101 in order to obtain an observed count. The weight on platform 101 causes a voltage difference to appear across terminals ANA+ and ANA−. The then measured weight is held in memory 218 and evaluated at step S4. Since this newest measurement has existed for only one sampling cycle, step S4 considers this measurement unstable and returns to step S2 for another measurement cycle. The cycling between steps S2 and S4 continues until the measurement remains, within a predetermined tolerance, constant for a predetermined settling interval of, for example, 200 ms. In some embodiments the weight signal will be deemed to have settled sufficiently when the measured value does not change more than 1% from one cycle to the next, without reference to some minimum passage of time. It will be appreciated that instead of 1%, other embodiments may employ a different percentage depending upon the desired speed of operation, accuracy, etc.

Step S5 follows this settling interval and there the latest stable measurement is compared against the immediately preceding stable measurement. Since this is the first stable measurement, step S5 determines the value is new and branches to step S6 where that new value is inserted as the first member of a measurements set. No further calculations are performed on this first member of the measurements set. The succeeding step S7 determines that too few measurements have accumulated in the set and returns control to step S2 where another measurement is made as before.

Also as before, step S4 waits to see if the current measurement remains unchanged for 200 ms. After that 200 ms delay, step S5 determines whether the latest measurement is a new value. If not new, the program branches to step S7, which verifies that no new measurements have occurred before returning control to measurement step S2.

This process continues until the user places additional pills on platform 101, that is, performs another staged transfer. Again, the operator observes this transfer and increases the value of the observed count. (Simply put, the operator keeps counting the pills). As before weight is measured and determined to be stable for 200 ms by step S4, step S5 verifies this measurement is a new value and transfers control to step S6 so this new value can be added to the measurements set. Step S7 now determines that the measurements set contains two values, but in this embodiment two measurements are deemed inadequate and control is returned to measurement step S2.

When for the third time the user counts out additional pills on platform 101 (staged transfer) and thereafter the measurement remains stable for 200 ms as determined by step S4, steps S5 and S6 are executed again and the new value is added to the measurements set.

At this time, the measurements set has three values and the program will consider this sufficient to calculate a count and/or weight. Accordingly, step S7 will transfer control to step S8 where the count and possibly weight will then be calculated, in a manner to be described presently. While in some cases the results may be immediately displayed, in this embodiment the results will be sent to display 102 when the weight-on-legs switch SW1 opens to indicate that the tray 100 has been lifted. In some embodiments the ending of the measurement session will be indicated by engagement sensor 256 of FIG. 4, the tilting of trough 112″ of FIG. 9, or the operation of tilt sensor 106/108 of FIG. 4. For embodiments employing the brakes 722 of FIG. 7, the ending of the measurement session will cause microprocessor 118 to release actuators 724 to lock platform 101 in place.

Whether the results are displayed immediately or delayed until tray 100 has been lifted, microprocessor 118 will issue a signal from terminal OUT4 to illuminate green LED 242, indicating that a count has been calculated, is available, and has satisfied certain predetermined reliability criteria.

Also, step S7 has a timeout feature that will transfer control to step S8 should the measured weight value remain unchanged for an excessively long period of time, say, five minutes. In the latter case the calculated results will be displayed at step S8, unless insufficient data is available, in which case step S8 will then output an error message.

How ever the calculation step S8 is reached, in succeeding step S9 the process will determine whether a reset is needed. If no reset is required weighing proceeds as before in step S2. However a reset may be required because a timeout has occurred in step S7, or because switch SW1 (FIG. 2A) has opened and then closed again, indicating tray 100 was lifted and then returned to a horizontal surface.

Basically, reset step S10 will be invoked, if either (a) weight-on-legs switch SW1 indicates tray 100 has just been placed down; (b) step S7 has timed out; or (c) the last weight measurement indicates a new measurement cycle has begun.

Regarding the last case (new measurement cycle), whenever pills were previously being added to platform 101, the start of the new measurement cycle is indicated by the measurement value changing to zero and then to some new, stable, positive value, in which case all older values are erased. Where incrementally declining measurements were just obtained due to staged removal of pills from the platform 101, the start of a new measurement cycle is indicated by the same criteria, that is, measurements changing to zero and then to a positive value.

If a reset is required, the data in the measurements set is no longer needed and will be cleared in step S10. The display 102 will also be cleared at this time.

Whether or not the measurements set is cleared, the program will return to measuring step S2 to either continue supplementing the measurement set or restart the counting process from the very beginning.

The calculation performed in step S8 will now be described. Overall, the program searches for submultiples in the three or more weight measurements contained in the measurements set. In one embodiment the measurements in the set are each divided by successively higher divisors that may be considered prospective weight values that potentially represent the weight of one pill. For example, starting from some predetermined initial value (e.g., 10 mg), the weight divisor may be incremented in 10 μg steps over a predetermined weight range until reaching some maximum value (e.g., 5 g). Calculating within these predetermined limits avoids calculating with unrealistic values.

As used herein, the term divisor refers to a real number, not necessarily an integer, that when divided into weight measurements contained in the measurements set, may or may not leave a remainder.

The remainders obtained for each of the above weight divisors will be a rating of the appropriateness of that weight divisor. In principle, if a prospective weight represents the actual weight of one pill, the remainders will be zero (within some measurement tolerance). Accordingly, the lower the remainders, the higher the rating. On the other hand, if one of the remainders obtained with a given divisor is high, that divisor would receive a lower rating. Essentially, the grading criterion will be based on the magnitude of the greatest remainder obtained for the divisor being rated.

The program will select the weight divisor having the highest rating, that is, having a group of remainders with the smallest maximum. In some cases the ratings comparison may lead to ties (or approximate ties) with two or more divisors having the same high rating. For example, when measuring 1 g pills, low remainders will be achieved for divisors of 1 g, ½ g, ⅓ g, ¼ g, ⅕ g, etc. In that case the program may arbitrate these ambiguities by selecting the highest (or lowest) divisor, or a divisor that corresponds to the most popular weight among the possibilities.

Instead of divisors that correspond to a prospective weight, other embodiments may use divisors corresponding to a prospective count. With this scheme, if one of the weights of the measurement set is divided by a whole number representing its actual count, the derived unit weight can then be evenly divided into the other weights in the measurements set without leaving a remainder (within the accuracy of the measurement). Accordingly, some embodiments will divide the first weight measurement by an integer and then use the resulting prospective unit weight (quotient) to divide the other weight measurements and rate the results using the greatest remainder produced by this division. These divisions are performed iteratively (divide lowest weight by one, then two, then three, and so on) to determine the derived unit weight with the best rating (rated by dividing the derived unit weight into the higher weights). The unit weight achieving the best rating will be used as the grading criterion for making a selection.

As before, if the ratings are ambiguous the program can arbitrate the ambiguities by selecting the highest (or lowest) unit weight or the most popular weight among the possibilities. The count associated with the highest weight measurement will be displayed as the final derived count.

In still another embodiment, each of the weight measurements can be a divided by integers within a predetermined count range, for example, predetermined count limits of 1-100. Then for each of the quotients (prospective unit weights) obtained from the lowest weight measurement, the program selects the closest matches from among the quotients calculated from the other weight measurements. The program will declare the absence of a match if the quotients cannot fall within some predetermined tolerance (for example, +/−0.5%). Consequently, for a set of n measurements the program will identify potential matches, each match being represented as an n-tuple of matching or nearly matching quotients (the quotients being candidates for the true unit weight). It will be noted, that for a given integer divisor applied to the low measurement, more than one matching n-tuple may be identified as a good candidate.

Each n-tuple so identified can be rated using various matching criteria such as the span of the n-tuple; the deviation from the average of the n-tuple; or other matching criteria. The n-tuple having the highest rating will be selected as the best estimate of the unit weight, and the count associated with the highest weight of the n-tuple will be displayed as the final derived count. In case of ambiguities the previously mentioned arbitration process can be employed.

Since the operator has been counting pills during the staged transfer of pills, the display of the derived count is a confirmation or corroboration of the observed count. This double check increases the reliability of the count and makes the instances of undetected operator error highly unlikely.

In embodiments having the microphone 224 of FIG. 4, the program can use the detected sound in various ways. In some embodiments the sound of pills being placed on the tray platform will be used to mark the start of a staged transfer, indicating that weight measurements will be unstable while the sound persists. The silence following the pill transfer can be used to start a settling interval that must elapse before measurements will be considered stable.

Some embodiments will detect the clicking noise caused by pills dropping onto the tray platform. The clicks will be counted to provide a rough estimate of the pill count. This rough estimate can be useful when arbitrating ambiguities as described above.

Referring to FIG. 10, components corresponding to those shown in FIG. 8 have the same reference numeral but increased by 700. In particular, movable weighing platform 801 is shown mounted above tray frame 800 and may be supported by springs. The springs are eliminated from this drawing for clarity, but are otherwise typically in the corners as shown, for example, in FIG. 7. This embodiment shows four platform corners. In other embodiments a different number of corners is contemplated, including one, two, three, or more than four, with springs existing in like number. In some embodiments no corners will exist because the outline is circular, oval, or has some other curved shape, in which case the springs may be distributed regularly around the periphery. In still other embodiments the springs may be located inboard away from the periphery.

In this embodiment the topside of tray frame 800 has in its four corners four rectangular, stationary conductive plates 802 in the form of copper laminations that may be adhesively secured or may be fabricated using printed circuit board techniques. Likewise, the underside of movable platform 801 has four opposing conductive plates 806 that are in registration with plates 802. Each of the plates 802 connect to wires 804, while each of the plates 806 connect to wires 808. Wires 804 and 808 are very fine gauge wire.

Wires 804 may be connected in common to one terminal of a capacitance-measuring detector (not shown), whose other terminal is commonly connected to the four wires 808. In other embodiments each of the four pairs of adjoining plates 802/806 may be separately connected as a pair to a capacitive measuring detector (either four measuring devices or one measuring device switched successively from pair to pair).

As the weight on platform 801 changes, the spacing and capacitance between plates 802 and 806 changes accordingly. Therefore, the capacitance can be taken as an indication of the weight on platform 801. In some embodiments the four capacitances can be separately measured for the four pairs of corner plates 802/806. In that case the capacitances will be averaged (or summed) before determining the weight on the platform 801.

Alternatively, a solenoid (e.g., solenoid 246 of FIG. 2B) may drive platform 801 to a neutral position, which position is verified when plates 802/806 achieve a predetermined capacitance. In that case the drive to the solenoid can be taken as a measurement of the weight on the platform.

Whether the platform weight is taken from the drive to the solenoid or from the measured capacitance of plates 802/806, in either event, a lookup table may be used to convert the relevant parameter to a weight value.

Figure 11A:
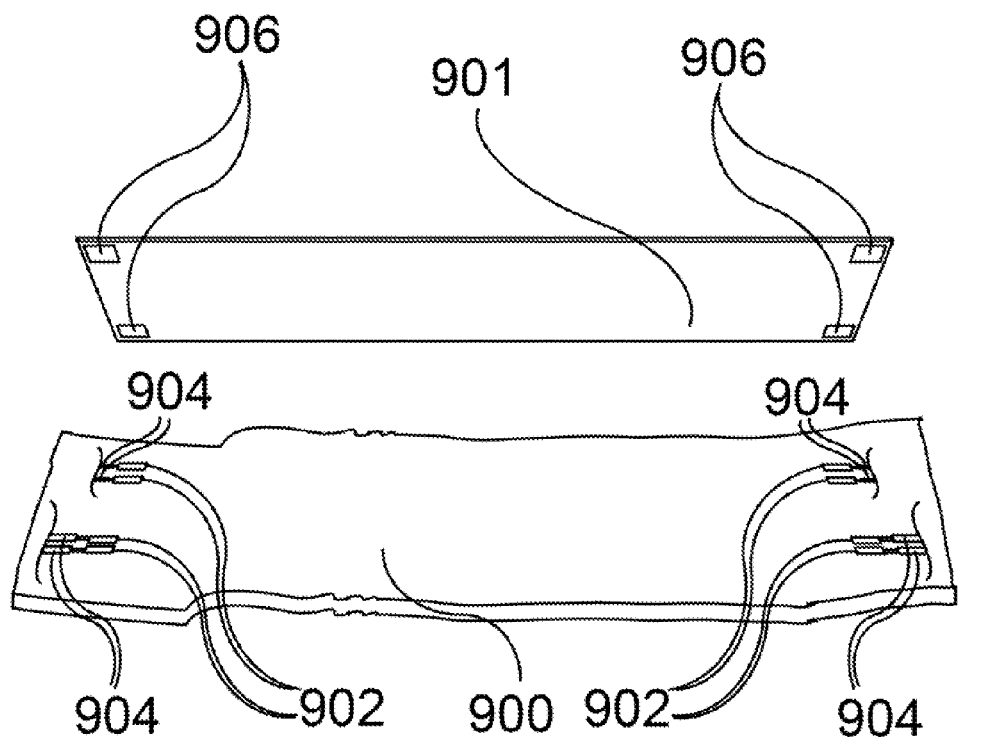
FIG. 11A is a perspective view, with portions broken away, of a weighing platform and frame that is an alternate to that of FIG. 10.
Figure 11B:
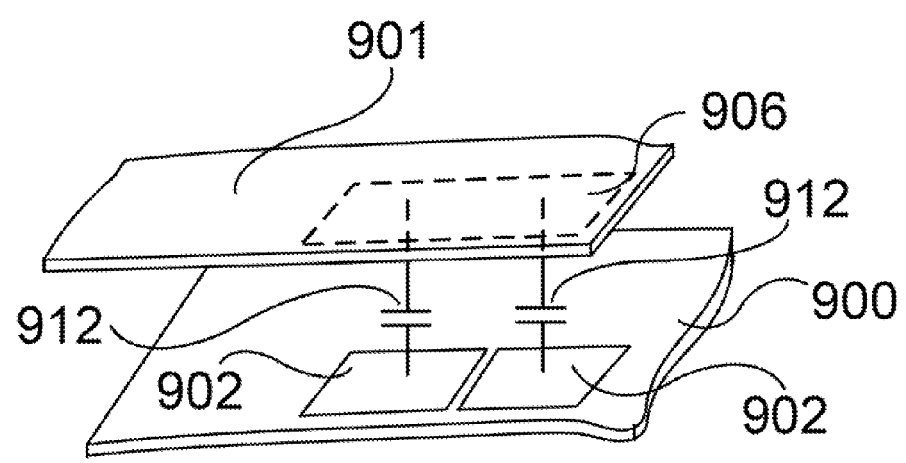
FIG. 11B is a detailed, fragmentary view of one corner of the platform and frame of FIG. 11A.

Referring to FIGS. 11A and 11B, components corresponding to those shown in FIG. 10 have the same reference numeral but increased by 100. In particular, movable weighing platform 901 is shown mounted above tray frame 900 and may be supported by springs as described before in connection with FIG. 10. In this embodiment the topside of tray frame 900 has four pairs of rectangular stationary plates 902, one pair in each corner. The underside of movable platform 901 has four opposing plates 906 that are in registration with the four pairs of subplates 902. Thus each plate 906 overlaps an underlying pair of subplates 902. Each of the subplates 902 separately connects to fine gauge wires 904. Plates 902 and 906 may be copper laminations fabricated as before.

With this configuration in each corner, two effective capacitors 912 are coupled to plate 906, one from each of the pair of subplates 902. The electrical bridging through plate 906 produces a series capacitance that can be measured from one of the subplates 902 to the other without the need to connect wires to plate 906 on tray 901.

Figure 2D:
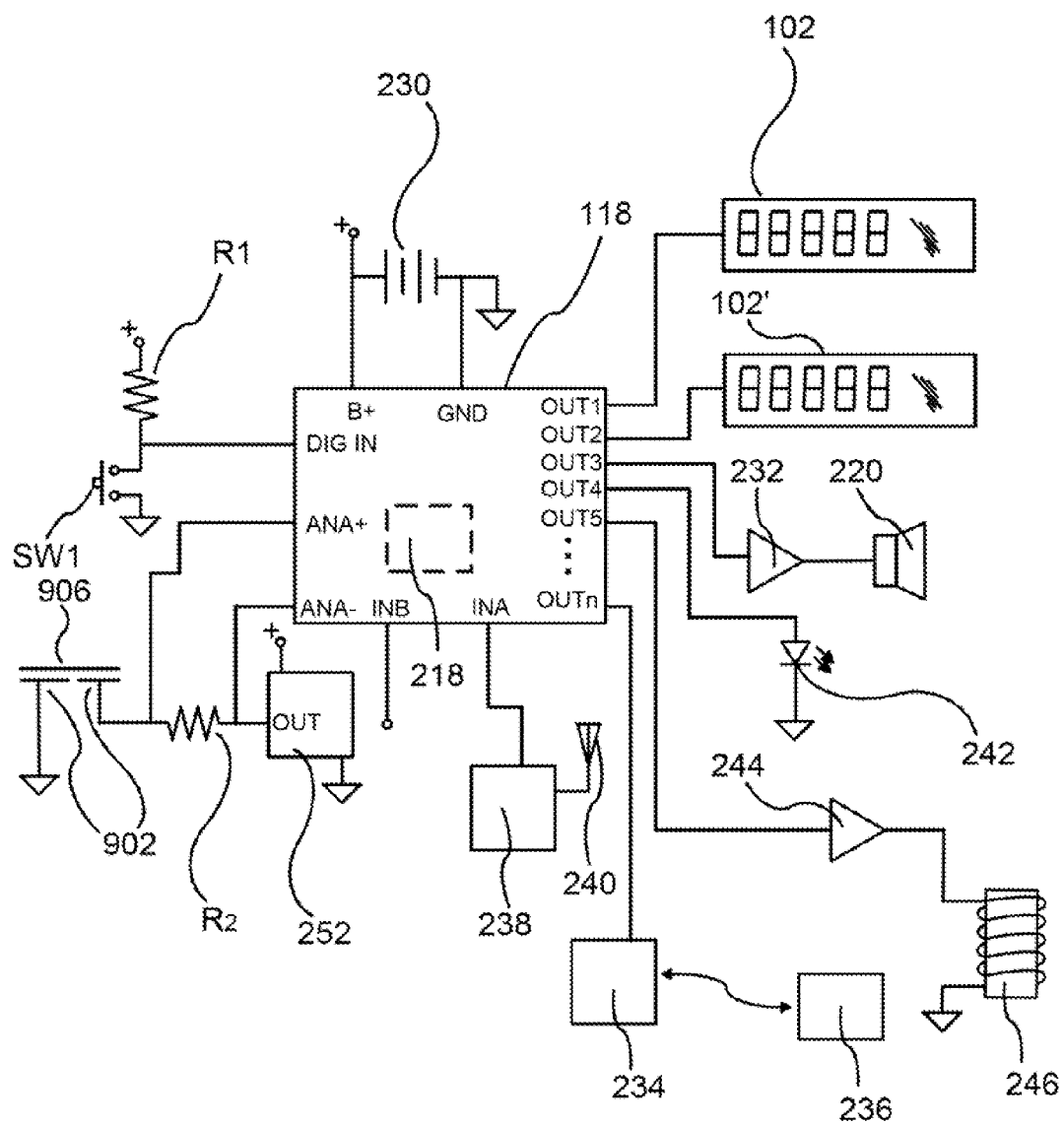
FIG. 2D is a schematic block diagram that is an alternate to that of FIGS. 2A, 2B and 2C.

Referring to FIG. 2D, this diagram is similar to FIG. 2C, except the linear variable differential transformer (LVDT) 248) is replaced with the capacitive plates 902 and 906 previously illustrated in FIGS. 11A and 11B. In FIG. 2D one of the subplates 902 is grounded and the other is connected to terminal ANA+ of microcontroller 118. Output OUT of oscillating voltage source 252 connects to terminal ANA− and to one terminal of resistor $R_2$, whose other terminal connects to terminal ANA+. Resistor $R_2$ acts as a current-sensing shunt, nominally a low value, but not necessarily so.

In the manner described earlier, the two subplates 902 are effectively coupled by a pair of serially connected capacitors (capacitors 912 of FIG. 11B) whose capacitance varies with the displacement relative to plate 906. This effective capacitor 902/906 is serially connected from ground through resistor $R_2$ to output OUT of source 252. It will be understood that for embodiments according to FIG. 10 capacitance plates 902/906 will be replaced with capacitance plates 802/806 of FIG. 10.

Microcontroller 118 senses the voltage waveform applied at terminal ANA− from oscillating source 252. (In some embodiments source 252 may be eliminated when a driving voltage is produced from terminal ANA− itself.) The current waveform thereby impressed on capacitance 902/906 produces a voltage drop whose magnitude or phase (or both) indicates the weight-induced displacement of plate 906. The state of capacitance 902/906 can be measured (a) directly at terminal ANA+ by measuring the voltage at the capacitance, or (2) indirectly by measuring with terminals ANA+ and ANA− the voltage across resistor $R_2$ to determine the current in the capacitance.

The value of capacitance 902/906 can be used as a measure of plate separation and weight, and can be converted to a weight value using, for example, the previously mentioned lookup table. However, in this embodiment, microcontroller 118 will use solenoid 246 to drive plate 906 to a neutral position that will produce a predetermined capacitance at effective capacitor 902/906. Arrival at this predetermined capacitance can be determined by either measuring the capacitor voltage (terminal ANA+) or the current in the capacitor (voltage across shunt $R_2$, as measured at terminals ANA+ and ANA−). Some embodiments will deal with the magnitude of the measurements, the measured phase angle, or both.

The value of C for the embodiment of FIG. 11B is the serial capacitance of effective capacitors 912. The embodiment of FIG. 10 has a simple capacitance (single capacitor).

Figure 12:
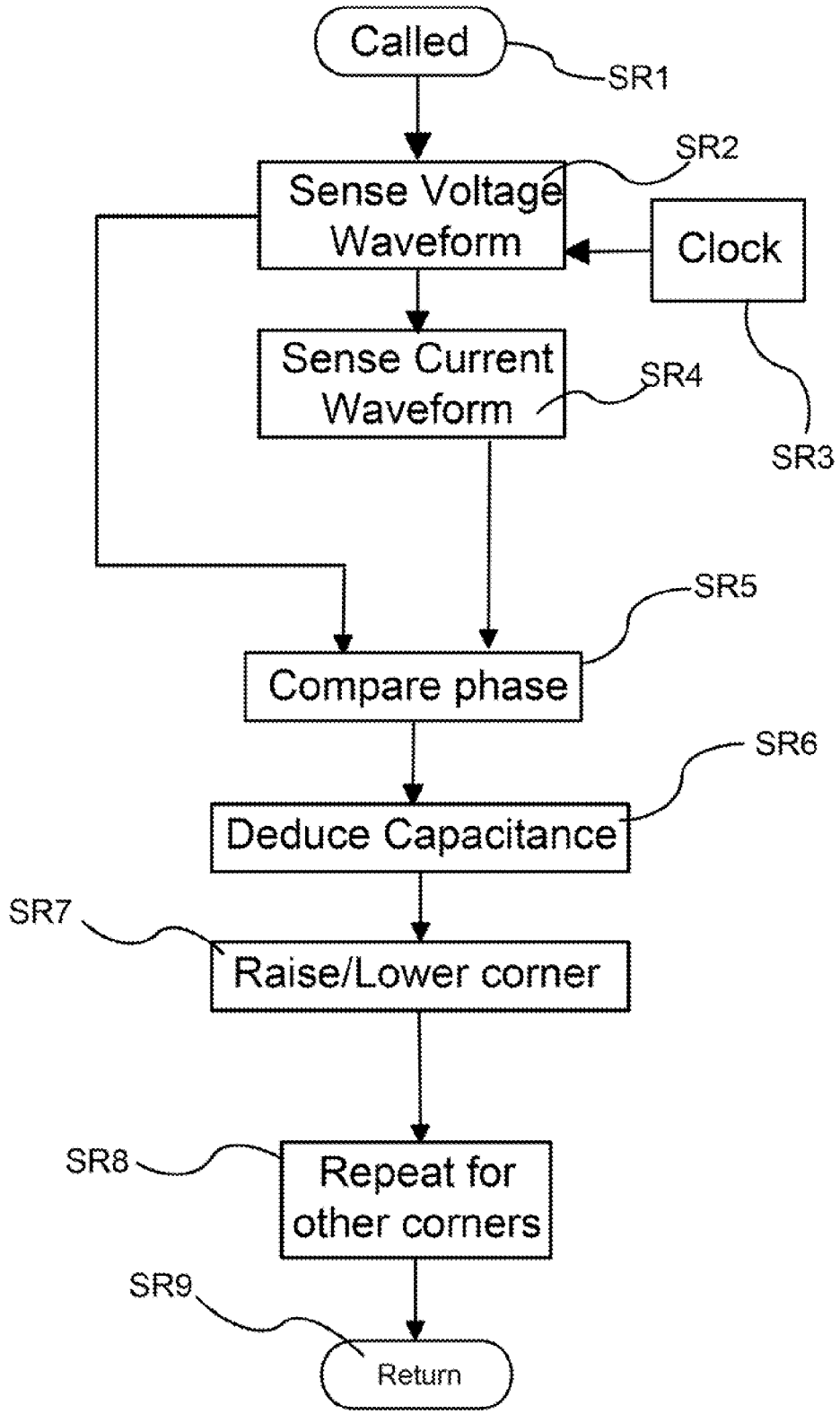
FIG. 12 is a flow chart supplementing the operation illustrated in the diagram of FIG. 6.

FIG. 12 is a flow chart of an exemplary subroutine for embodiments exploiting capacitance 902/906 of FIG. 2D. The microcontroller 118 executes this routine as a background thread during processing steps S2, S4 and S8 of FIG. 6.

When called, the routine of FIG. 12 senses the voltage waveform V (input from pin ANA−) at step SR2, and at step SR4 the current waveform I from the signal between terminals ANA+ and ANA−. With current shunt $R_2$ essentially resistive and the plate capacitance (plates 902/906) is essentially reactive, a divider is formed between the capacitance and the resistance wherein the effect of the capacitance can be deduced. A phase shift between the voltage V across the divider and the resulting current I can be determined in step SR5 by temporally comparing for the respective signals V and I either the maximums or the zero crossings relative to an impressed periodic waveform from the clock of step SR3.

The capacitive/resistive divider is evaluated by considering the impedance Z (of the capacitance 902/906) in series with resistor $R_2$. This series connection gives a voltage division ratio of: $1/j\omega C/(1/j\omega C+R_2)$, or equivalently $1/(1+j\omega CR_2)$. Knowing the impressed radian frequency $\omega$ (from ANA−) and using the value of $R_2$ one can deduce the capacitance from the measured phase shift.

Alternatively, one can obtain the current flow (from the voltage difference between ANA+ and ANA−) and then from the voltage and frequency at the capacitance deduce the value of C using the reactance formula $1/j\omega C$. In fact for small values of $R_2$, one can ignore the effect of the shunt resistance, and just approximate capacitance from the ratio of voltage to current measured by microcontroller 118 using the reactance $1/j\omega C$, to infer the overall impedance, and in turn the value of C.

While the foregoing showed serial resistance and capacitance, other embodiments can employ parallel resistance and capacitance. In some cases an inductor could be substituted for the resistance (connected either in series or in parallel) and the resonant frequency can be used to deduce the capacitance. In any of the parallel cases the parallel elements are placed between the terminals ANA+ and ANA−.

Two implementations are possible here including: (1) using the measured capacitance value to deduce plate separation and thus weight (using the known value of Hooke's constant of the support spring, e.g., springs 726 of FIG. 7); or (2) circumventing the need to use Hooke's constant and applying in step SR7 a solenoid drive signal that will raise or lower each platform corner to a neutral location, and then converting that solenoid drive value to weight using a lookup table. For this first implementation (Hooke's constant) step SR7 is eliminated and the value of capacitance can be related to displacement and weight directly, with the possibility of linearization using an appropriate routine in the microcontroller's memory.

The following assumes the second (solenoid) implementation: At step SR8 the sequence of step SR7 is repeated for the other corners. This sequence is reiterated until all corners are essentially in the neutral positions. In some cases the monitored positions may be located differently or may be different in number than the four corners previously described. The solenoid drives associated with bringing the several locations to neutral can be averaged (or summed) and then correlated to a weight value.

It is appreciated that various modifications may be implemented with respect to the above described embodiments. The system can be arranged to weigh or count objects other than pills and these other objects can be significantly heavier or lighter than such pills. In addition, the system can be arranged to have a relatively high or relatively low accuracy, depending upon circumstances. Depending on the objects to be weighed, the system can have a tray of various shapes and depths and the tray may have an outline that is circular, oval, polygonal or other outlines. In addition, in some embodiments the system may be a subassembly in a larger assembly that may use the results produced by the system. Moreover, the system may be connected in a network to communicate with similar systems or with a larger plant. The various programming steps described herein can be performed in any order while other steps may be eliminated or added. In some embodiments, the system may have buttons or other mechanical controls to indicate in advance to the program, the approximate unit weight, the unit weight range, the expected count, or the expected count range for the upcoming session. In cases where assistance is needed to achieve a desired count, the system may signal whether the current count is high or low. Separate displays are disclosed for showing the calculated count and an advertising message, but some embodiments may have a single display that provides an advertising message when count information is unavailable or stale. In one option the advertising message is wirelessly adjusted. While the disclosed displays faced outwardly from either the top or bottom of a frame, in some embodiments the display may face inwardly against a transparent structure and so thereby remain visible.

Obviously, many modifications and variations of the present invention are possible in light of the above teachings. It is therefore to be understood that within the scope of the appended claims, the invention may be practiced otherwise than as specifically described.

The invention claimed is:

1. A counting scale for totaling the number of common articles transferred in stages relative to said counting scale, comprising:
   a weighing device for successively providing upon each staged transfer of the common articles a weight signal signifying the current weight, the weight signal having consecutive values progressively changing over the stages;
   a processing device coupled to said weighing device for calculating a count in response to the weight signal provided by said weighing device for staged transfers, said processing device being operable to programmatically apply more than one from a series of divisors to at least one of the consecutive values of the weight signal and obtain from one of the consecutive values a plurality of quotients, in order to automatically discern submultiples in the consecutive values by using a grading criterion selected from the group consisting of (1) closeness of a pair of quotients from different stages, and (2) nearness of a quotient to even division; and
   an output device coupled to the processing device for presenting the count calculated by said processing device.

2. A counting scale according to claim 1 wherein said processing device is operable in response to said weight signal remaining stable for a predetermined period of time to incorporate the current value of said weight signal into the consecutive values.

3. A counting scale according to claim 1 wherein said processing device is operable (a) to cyclically obtain the weight signal, and (b) in response to said weight signal changing less than a predetermined percentage per cycle to incorporate the current value of said weight signal into the consecutive values.

4. A counting scale according to claim 1 wherein said series of divisors are prospective weight values, said processing device being operable to assign to each one in the series of divisors a set of remainders resulting from applying said series of divisors to said consecutive values, said processing device using the maximum value in the set of remainders for each one of the series of divisors as a grading criterion for selecting one of the series of divisors to be used to determine weight.

5. A counting scale according to claim 1 wherein said series of divisors are prospective counts, said processing device being operable to assign to each one of the consecutive values a series of quotients resulting from applying said series of divisors to said consecutive values, said processing device selecting from the series of quotients for each of the consecutive values matches chosen according to a predetermined matching criterion in order to determine weight.

6. A counting scale according to claim 1 wherein said processing means is operable to calculate a count based on staged arrival of common articles on said weighing device.

7. A counting scale according to claim 1 wherein said processing means is operable to calculate a count based on staged removal of common articles on said weighing device.

8. A counting scale according to claim 1 wherein said processing device is programmed to perform calculations within predetermined limits and eliminate calculations that violate said predetermined limits, said predetermined limits include one or more of a predetermined weight range and a predetermined count range.

9. A counting scale according to claim 1 wherein said weighing device includes a tray with a trough.

10. A counting scale according to claim 9 wherein said output device is mounted on an underside of said tray to obscure visibility of said output device when said tray is resting on a substantially horizontal surface.

11. A counting scale according to claim 9 wherein said output device includes an advertising display adapted to present commercial information.

12. A counting scale according to claim 11 wherein said advertising display has a wireless connection to a source of advertising content.

13. A counting scale according to claim 1 wherein said weighing device includes at least one of a strain gauge, Wheatstone bridge, servo, solenoid, LVDT sensor, RVDT sensor, and spring.

14. A counting scale according to claim 1 wherein said weighing device includes a finish sensor coupled to said processing device for sensing engagement of said weighing device indicating preparation for removal of the common articles.

15. A counting scale according to claim 14 wherein said output device is ineffective in presenting a count until said finish sensor indicates preparation for removal of the common articles.

16. A counting scale according to claim 14 wherein said weighing device comprises:
a frame;
a weighing platform mounted at said frame for receiving the common articles; and
a brake for holding said platform fixed relative to said frame, said processing device operating said brake in response to said finish sensor indicating preparation for removal of the common articles.

17. A counting scale according to claim 14 wherein said finish sensor comprises:
a switch for sensing translation of said counting scale.

18. A counting scale according to claim 14 wherein said weighing device comprises:
a frame having a handle, said finish sensor comprising an engagement sensor coupled to said processing device for sensing manual engagement of said handle.

19. A counting scale according to claim 14 comprising:
a frame; and
a trough rotatably mounted at said frame to articulate and dispense any of the common articles in said trough, said finish sensor comprising a switch coupled to said trough for detecting articulation thereof.

20. A counting scale according to claim 14 comprising:
a frame; and
a trough with a hinged cover mounted at said frame to articulate and dispense any of the common articles in said trough, said finish sensor comprising a switch coupled to said hinged cover for detecting closing thereof onto said trough.

21. A counting scale according to claim 1 comprising:
a microphone coupled to said processing device for detecting transfer of the common articles relative to said weighing device.

22. A counting scale according to claim 1 comprising:
an annunciator coupled to said processing device to be driven thereby after calculation of a count by said processing device has been completed and has satisfied a predetermined reliability criterion.

23. A counting scale according to claim 1 wherein said weighing device comprises:
a movable weighing platform for receiving the common articles;
a position sensor coupled to said platform for providing to said processing device a position signal indicating position of said platform; and
an actuator coupled to said platform for moving it, said processing device being operable to automatically drive said actuator in order to bring said platform to a predetermined neutral position, wherein a predetermined characteristic of drive applied to said actuator is taken as a weight indication.

24. A counting scale according to claim 23 wherein said processing device converts the drive applied to said actuator to a weight value by using a lookup table stored in memory.

25. A counting scale according to claim 1 wherein said weighing device comprises:
a frame having at least one stationary conductive plate; and
a moveable platform having at least one opposing conductive plate in registration with the at least one stationary conductive plate, the weight signal signifying the extent of capacitive coupling between the at least one stationary plate and the at least one opposing plate.

26. A counting scale according to claim 25 wherein the at least one stationary conductive plate comprises at least one spaced pair of subplates in registration with the at least one opposing plate, the weight signal being produced in accordance with capacitive coupling between the at least one pair of subplates as affected by the cross-coupling through the at least one opposing plate.

27. A counting method for totaling the number of common articles transferred in stages relative to a platform, comprising the steps of:
successively weighing upon each staged transfer of the common articles the current weight at the platform, each staged transfer leaving on the platform some of the common articles left on the platform after another staged transfer; and
calculating a derived count based on the weight at the platform upon each staged transfer, the calculation being performed by programmatically applying more than one from a series of divisors to at least one of the consecutive values of the weight at the platform and obtaining from one of the consecutive values a plurality of quotients, in order to discern submultiples in the consecutive values by using a grading criterion selected from the group consisting of (1) closeness of a pair of quotients from different stages, and (2) nearness of a quotient to even division.

28. A counting method according to claim 27 comprising the steps of:
observing each staged transfer in order to directly obtain an observed count of the common articles on the platform; and
confirming the accuracy of the observed count by comparing it to the derived count.

29. A counting method according to claim 28 wherein the observed count is obtained before the derived count.

30. A counting method according to claim 27 wherein the step of successively weighing is performed upon the weight at the platform remaining stable for a predetermined period of time.

31. A counting method according to claim 27 wherein said series of divisors are prospective weight values, the step of calculating being performed by assigning to each one in the series of divisors a set of remainders resulting from applying said series of divisors to said consecutive values, the step of calculating being further performed by using the maximum value in the set of remainders for each one of the series of divisors as a grading criterion for selecting one of the series of divisors to be used to determine weight.

32. A counting method according to claim 27 wherein said series of divisors are prospective counts, the step of calculating being performed by assigning to each one of the consecutive values a series of quotients resulting from applying said series of divisors to said consecutive values, the step of calculating being further performed by selecting from the series of quotients for each of the consecutive values matches chosen according to a predetermined matching criterion in order to determine weight.

33. A counting method according to claim 27 wherein the step of calculating is performed based on staged arrival of common articles on said platform.

34. A counting method according to claim 27 wherein the step of calculating is performed based on staged removal of common articles on said platform.

35. A counting method according to claim 27 wherein the step of calculating is performed within predetermined limits to eliminate results that violate said predetermined limits, said predetermined limits include one or more of a predetermined weight range and a predetermined count range.

36. A counting method according to claim 27 wherein the platform includes a tray with a trough, the method including the step of withholding the derived count results obtained by the calculating step until after the last transfer relative to the platform.

37. A counting method according to claim 36 wherein the step of withholding is performed by displaying a derived count on an underside of said tray to obscure visibility of said output device when said tray is resting on a substantially horizontal surface.

38. A counting method according to claim 27 including the step of displaying commercial information on the tray.

39. A counting method according to claim 38 wherein the step of displaying commercial information is performed by updating advertising content through a wireless connection.

40. A counting scale for totaling the number of common articles transferred in stages relative to said counting scale, comprising:
a weighing device having a tray with a trough for successively providing upon each staged transfer of the common articles a weight signal signifying the current weight, said weighing device including at least one of a strain gauge, Wheatstone bridge, servo, solenoid, LVDT sensor, RVDT sensor, and spring;
a processing device coupled to said weighing device for calculating a count in response to the weight signal provided by said weighing device for staged transfers, said processing device being operable to programmatically apply at least some of a series of divisors to consecutive values of the weight signal in order to automatically discern submultiples in the consecutive values, said processing device being operable in response to said weight signal stabilizing to incorporate the current value of said weight signal into the consecutive values, said processing device being programmed to perform calculations within predetermined limits and eliminate calculations that violate said predetermined limits, said predetermined limits including one or more of a predetermined weight range and a predetermined count range, said weighing device including a finish sensor coupled to said processing device for sensing engagement of said weighing device indicating preparation for removal of the common articles;
a microphone coupled to said processing device for detecting transfer of the common articles relative to said weighing device;
an output device coupled to the processing device for presenting the count calculated by said processing device, said output device being ineffective in presenting a count until said finish sensor indicates preparation for removal of the common articles, said output device being mounted on an underside of said tray to obscure visibility of said output device when said tray is resting on a substantially horizontal surface, said output device including an advertising display adapted to present commercial information, said advertising display having a wireless connection to a source of advertising content; and
an annunciator coupled to said processing device to be driven thereby after calculation of a count by said processing device has been completed and has satisfied a predetermined reliability criterion.

* * * * *